United States Patent
Hirano et al.

(10) Patent No.: US 6,176,125 B1
(45) Date of Patent: Jan. 23, 2001

(54) EXHAUST GAS FLOW MEASURING EQUIPMENT FOR INTERNAL COMBUSTION ENGINES AND PROCESSES FOR CALIBRATING SENSITIVITY OF TRACE GAS FLOW METERS

(75) Inventors: Takashi Hirano; Masayuki Adachi; Minoru Shimooka; Kazuki Makimura, all of Miyanohigashi-machi (JP)

(73) Assignee: Horiba, Ltd., Kyoto (JP)

( * ) Notice: Under 35 U.S.C. 154(b), the term of this patent shall be extended for 0 days.

(21) Appl. No.: 09/012,746

(22) Filed: Jan. 23, 1998

(30) Foreign Application Priority Data

| Jan. 25, 1997 | (JP) | 9-025954 |
| Jan. 31, 1997 | (JP) | 9-033032 |
| Feb. 14, 1997 | (JP) | 9-047100 |
| Oct. 23, 1997 | (JP) | 9-309382 |

(51) Int. Cl.⁷ .................................................. G01M 15/00
(52) U.S. Cl. .................... 73/118.1; 73/23.31; 73/861.07
(58) Field of Search .................. 73/23.31, 23.32, 73/30.03, 30.04, 118.1, 861.07

(56) References Cited

U.S. PATENT DOCUMENTS

| 3,634,053 | 1/1972 | Klass et al. . | |
| 3,727,048 | * 4/1973 | Haas | 250/43.5 MR |
| 3,837,228 | 9/1974 | Nemeth et al. . | |
| 3,881,351 | 5/1975 | Prachar et al. . | |
| 3,924,442 | 12/1975 | Kerho et al. . | |
| 3,986,386 | 10/1976 | Beltzer et al. . | |
| 4,121,455 | 10/1978 | Haslett et al. . | |
| 4,153,418 | * 5/1979 | Haas | 73/194 M |
| 4,167,870 | * 9/1979 | Haas | 73/194 M |
| 4,727,746 | 3/1988 | Mikasa et al. . | |
| 5,354,990 | 10/1994 | Dankworth et al. . | |
| 5,567,885 | * 10/1996 | Garside | 73/861.07 |
| 5,594,179 | 1/1997 | Marsh . | |
| 5,639,957 | 6/1997 | Zarchy . | |
| 5,672,827 | * 9/1997 | Jursich | 73/861.07 |

FOREIGN PATENT DOCUMENTS 8-015253  1/1996 (JP) .

* cited by examiner

Primary Examiner—Eric S. McCall
(74) Attorney, Agent, or Firm—Oppenheimer Wolff & Donnelly LLP

(57) ABSTRACT

An exhaust gas flow rate measuring equipment for internal combustion engines supplies helium gas only to a trace gas analyzer. The condition in which the inside of the trace gas analyzer in the high-vacuum stage causes pressure fluctuation due to the viscosity of the exhaust gas and the introduction rate of helium gas fluctuates in proportion to the fluctuation rate can be prevented. Also the, problem of the sensitivity varying in accordance with the gas component ratio in the exhaust gas can be solved.

12 Claims, 21 Drawing Sheets

F I G. 10
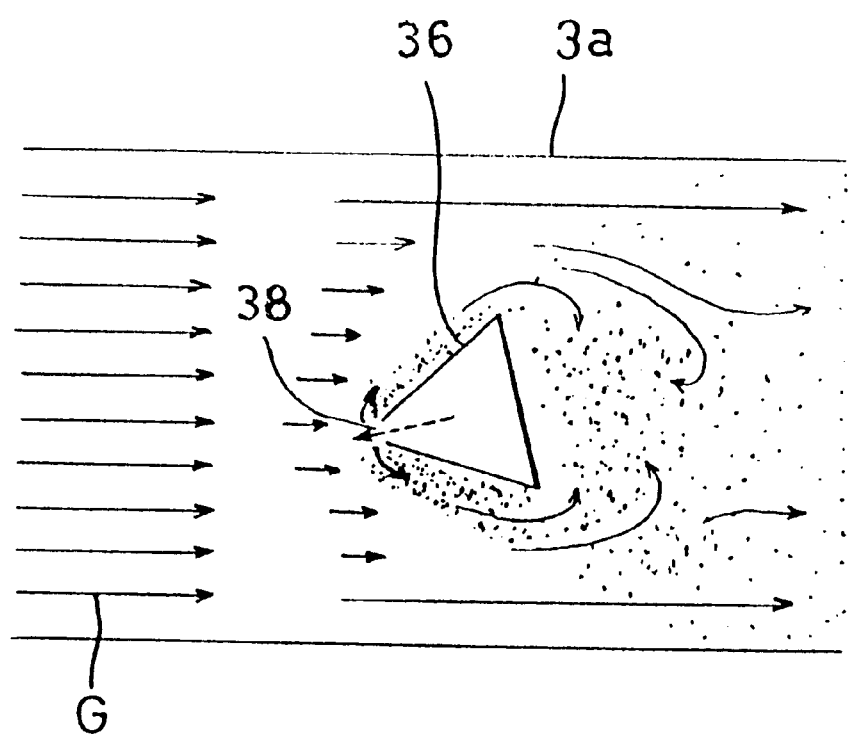

FIG. 17A
FIG. 17B
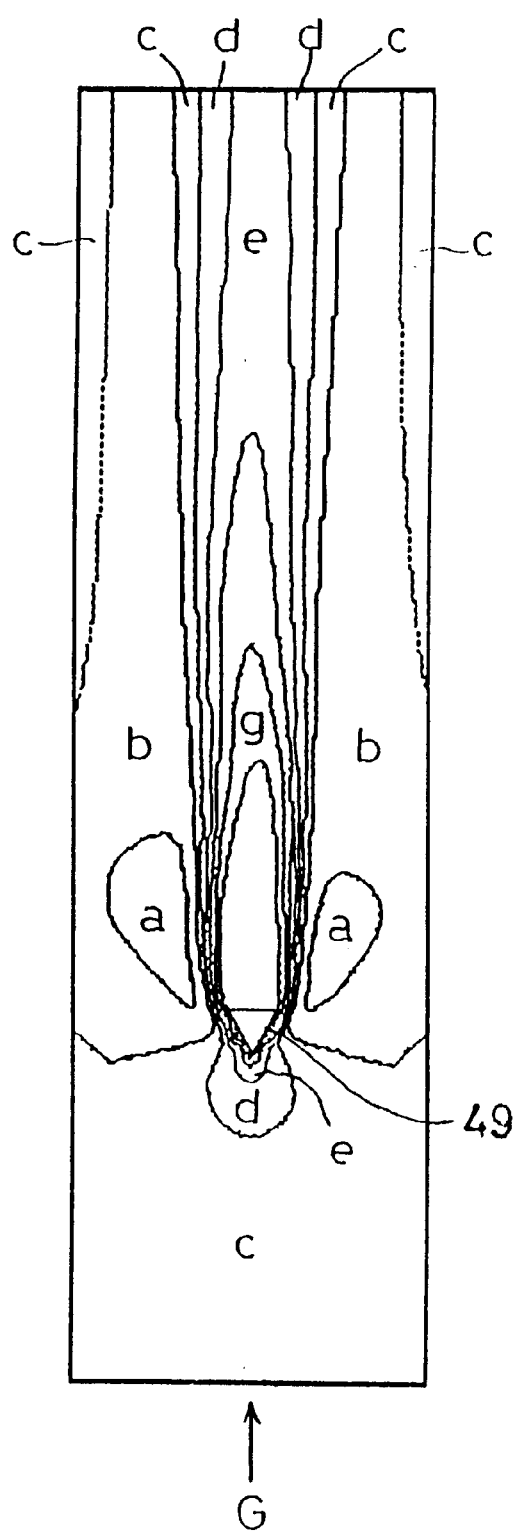
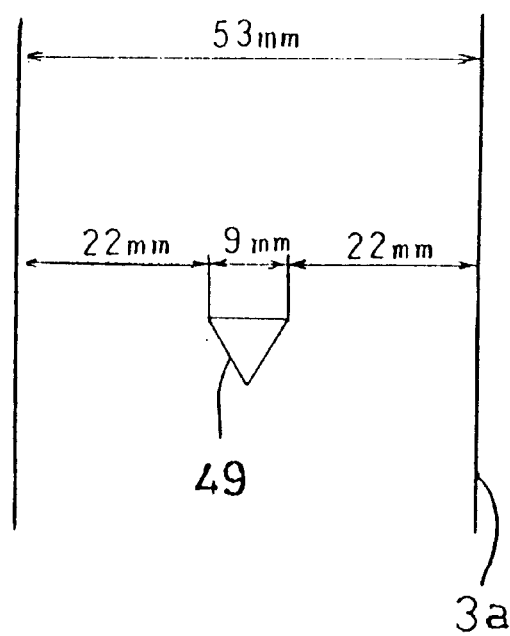

EXHAUST GAS FLOW MEASURING EQUIPMENT FOR INTERNAL COMBUSTION ENGINES AND PROCESSES FOR CALIBRATING SENSITIVITY OF TRACE GAS FLOW METERS

BACKGROUND OF THE INVENTION

1. Field of the Invention

The present invention relates to an exhaust gas flow measuring equipment for measuring the rate at which gas is discharged from internal combustion engines and to processes for calibrating the sensitivity of a trace gas flow meter.

2. Description of the Prior Art

In order to carry out transient characterization of gas discharged from internal combustion engines (hereinafter call "exhaust gas"), the exhaust gas flow rate must be measured in real time. A trace method is one technique used to continuously measure the exhaust gas flow rate. This trace method introduces inert gas, for example, helium gas, which does not react with the components in the exhaust gas to the exhaust passage linked to the internal combustion engine. The method then measures the helium gas concentration with a trace gas analyzer connected to the gas sampling passage connected to the exhaust passage. The exhaust gas flow rate is then determined in real time by dividing the introducing rate of the helium gas by the concentration of the helium gas.

Examples of equipment for measuring the exhaust gas flow rate operating on the above-mentioned conventional measuring principle include that disclosed in Japanese non-examined Patent Publication No. Hei 8-15253. FIG. 22 schematically shows conventional engine exhaust gas flow rate measuring equipment disclosed in this patent publication. Numeral 71 designates an engine, numeral 72, a compressed gas cylinder for introducing helium gas as inert gas into this engine 71, and numeral 73, a pressure reducing valve. Numeral 74 designates an exhaust passage linked to the engine 71. Numeral 75 designates a gas sampling passage branched and connected to the exhaust passage 74 at the upstream side, which is equipped with a filter 76 and a suction pump 77, and joined and connected to the exhaust passage 74 on the downstream side. Numeral 78 designates a trace gas analyzer connected to the gas sampling passage 75 via a connecting member 79.

The trace gas analyzer 78 may be a quadruple mass spectrometer, sector field mass spectrometer, or similar device, but since these analyzers have a high vacuum inside, microleakage orifice or variable leak valve (VLV) is used for the connecting member 79 in connecting to the gas sampling passage 75 to which the filter 76, the suction pump 77, etc. are installed.

In measuring the exhaust gas flow rate, for example, helium gas must be introduced as a trace gas into the exhaust pipe 74a linked to the engine 71. But conventionally, as shown in FIG. 23, a pipe 75 comprising of, for example, tetrafluorethylene resin which is strong to, for example, exhaust gas G and can withstand comparatively high temperature, is inserted and connected to cross nearly at right angles to the direction in which the exhaust gas G flows. Helium gas TG is introduced as trace gas to the exhaust pipe 74a in which exhaust gas G flows via this pipe 75. However, in the above-mentioned configuration a number of problems exist as described below, and the measurement accuracy of the exhaust gas flow rate is not always satisfactory.

As the microleakage orifice of VLV has a large inside dead volume, when a plurality of other gas analyzers are connected to the gas sampling passage 75 and exhaust gas components such as CO, $CO_2$, $NO_x$, HC, etc. are analyzed with these gas analyzers, lag time is generated in the trace gas analyzer 78 and the gas analyzer, and the output timing must be adjusted in both analyzers.

As the inside of the trace gas analyzer 78 is originally of high vacuum, the sensitivity varies in accordance with the gas component ratio in the exhaust gas. That is, when the trace gas analyzer 78 has its temperature adjusted to a specified level, helium gas is introduced while being mixed in the exhaust gas at a specified concentration via the connecting member 79. In the continuous measurement of exhaust gas discharged from the internal combustion engine such as automobile engines, if the exhaust gas component to be measured suddenly changes, the difference is generated in pressure inside the trace gas analyzer 78 due to the difference of viscosity depending on this exhaust gas component. If the pressure, volume, and temperature inside the trace gas analyzer 78 are denoted by P, V (constant), and T (constant), then the equation $PV=nRT$ (n: molecular number of helium gas and R: constant) holds for the helium gas. But when the pressure change $\Delta P$ is, for example, positive, since P is proportional to n in the above equation, the introducing amount of helium gas increases, and the reading of the helium gas in the exhaust gas becomes higher than the actual value. Also, the low exhaust gas flow rate is indicated. On the contrary, if the pressure variation is negative, the helium introducing volume decreases in proportion to this variation, and then the reading of helium gas in the exhaust gas becomes lower than the actual value. And for exhaust gas flow rate, a higher value is obtained.

In FIG. 23, while the inside diameter of exhaust pipe 74a is as large as 100 mm, that of the pipe 75 for introducing helium gas is about 4 mm. As pipe 75 is inserted in such a manner to simply cross at right angles with the flowing direction of exhaust gas with respect to the exhaust gas 74a, mixing of the exhaust gas G from the engine with helium gas TG does not always take place satisfactorily. Consequently, errors occur in the helium gas concentration measurement results by the trace gas analyzer 78, and there has been an inconvenience in that the measurement accuracy of the exhaust gas flow rate is not always satisfactory.

On the other hand, with respect to the sensitivity calibration method, conventionally pure nitrogen gas ($N_2$) is used for zero gas. At the same time, a mixture of several tens to several thousands ppm of helium gas is added with pure $N_2$ as base for span gas which is used for zero calibration and span calibration of the trace gas analyzer. Problems analogous to those described above exist with this configuration.

As no consideration is given to carbon dioxide ($CO_2$) contained in a large quantity next to $N_2$ in the exhaust gas and as calibration was carried out, the sensitivity change and the desired sensitivity calibration are unable to be carried out. With regard to the calculation of continuous mass emission rate from a car, the measured flow rate and a gas concentration for each gaseous constituents must be multiplied. In the conventional way, since the flow rate is always measured as a whole, gaseous constituents and the gas concentration is typically dehumidified concentration, either the measured flow rate must be converted to dehumidified concentration or the gas concentration must be converted to pre-humidified concentration with mathematical way. The conversion generates additional source of error in getting mass emission due to the water vapor concentration has to be assumed on the perfect combustion in the engine.

SUMMARY OF THE INVENTION

The present invention solves the above-mentioned problems. The invention provides an exhaust gas flow rate measuring equipment of internal combustion engines which can measure the desired exhaust gas flow rate minimizing time lag for other gas analyzers. In addition, the invention can reduce the sensitivity change as much as possible. The invention thus enables the exhaust gas to reliably mix with the trace gas so that an accurate measurement of the exhaust gas flow rate can be made.

In addition, this invention intends to provide an excellent process for calibrating the sensitivity of a trace gas flow meter which can reduce the sensitivity change as much as possible.

BRIEF DESCRIPTION OF THE DRAWINGS

FIG. 10 schematically illustrates an operation of the equipment shown in FIG. 7;

FIG. 17a shows a simulation indicating the mixing condition of the exhaust gas and trace gas when the arrangement of a triangular pole is changed in the fifth embodiment of the invention;

FIG. 17b schematically shows when the arrangement condition of the triangular poles is changed in the fifth embodiment of the invention;

DETAILED DESCRIPTION OF THE PREFERRED EMBODIMENTS

Figure 1:
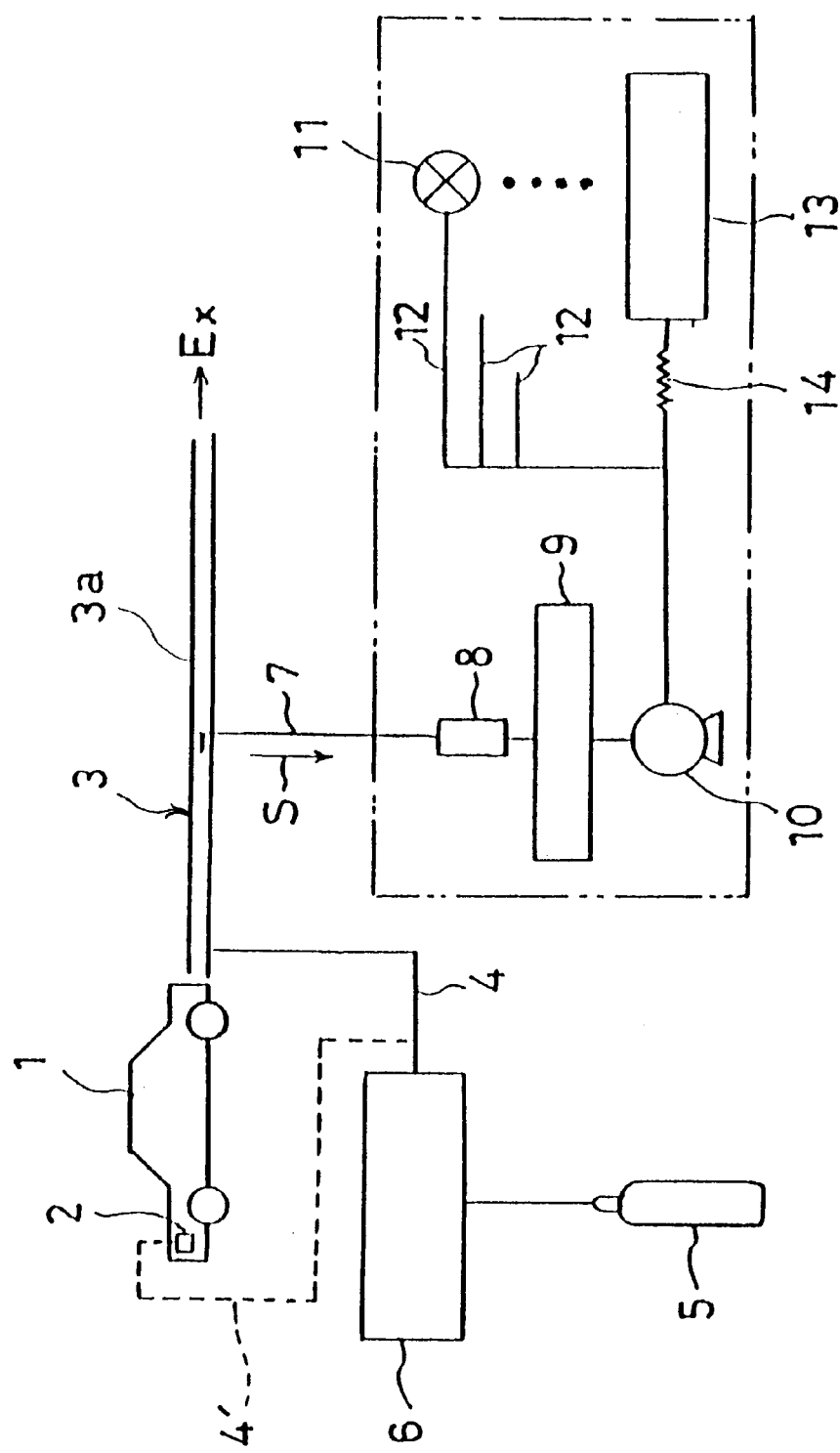
FIG. 1 schematically shows exemplary exhaust gas analyzing equipment incorporating an exhaust gas flow measuring equipment for internal combustion engines in accordance with a first configuration according to first and second embodiments of the invention.

Because in the first and the second embodiments, tubing with a suitable inside diameter such as capillary is used for a member to connect the gas sampling passage to the trace gas analyzer, the sample gas of a specified flow rate can be supplied to the trace gas analyzer. At the same time, the dead volume at the connections can be reduced as much as possible, and the delay in response caused by the dead volume can be reduced. Consequently, time lag associated with gas analyzers connected to the gas sampling passage can be eliminated. Consequently, the problems of conventional systems discussed above can be solved.

Because in the third and the fourth embodiments of the invention, the gas sampling passage is connected to the trace gas analyzer via a porous thin film which, for all preferable purposes permeates helium gas as trace gas, and because the atomic weight of helium is far different from that of the substance existing in the exhaust gas, the introduction of unrequired exhaust gas component can be prevented, and, only helium gas can be preferably supplied to the trace gas analyzer. Consequently, the condition in which the trace gas analyzer (which is held in a high-vacuum state) causes pressure fluctuation due to the viscosity of the exhaust gas and in which the introduction rate of helium gas is varied in proportion to this fluctuation rate can be prevented. Consequently, the problem discussed above in which the sensitivity varies in accordance with change in vacuum pressure that depends on the gas component ratio in the exhaust gas can be solved.

Because in the fifth embodiment of the invention, a suitable turbulence occurs downstream from the introduction point of trace gas into the exhaust pipe and the exhaust gas is mixed with the trace gas surely and thoroughly, the exhaust gas flow rate can be accurately measured. Also, both end portions of the housing may be either brought in contact with or separated from the inner wall of the exhaust pipe. In this case, a large turbulence can be generated downstream from the introduction point of trace gas, with a pressure drop suppressed. Also the trace gas and the exhaust gas can be efficiently mixed. Consequently, the problems described above can be solved.

In the fifth embodiment of the invention, the cross-sectional profile of the tube in the flow direction of the exhaust gas may be designed to by symmetrical, such as an isosceles triangle, but may be designed to be an asymmetric triangle. Alternatively, symmetrical triangles, such a isosceles triangles, may be arranged asymmetrically so that a large turbulence such as Lancaster eddies (generated by, for example, the pressure difference) can be generated, and so that the trace gas and the exhaust gas can be mixed more efficiently. In addition, in the fifth embodiment of the invention, the cross-sectional profile of the tube is not limited to the triangular configuration but may be a quadrangle or a hexagon. In these cases, an asymmetrical form can generate larger turbulence.

In the sixth and the seventh embodiment of the invention, a calibration is carried out with care taken on $CO_2$ which is contained in a large quantity compared with $N_2$ in the exhaust gas. It is thus possible to suppress the sensitivity change to a low level, and the desired calibration can be surely carried out. Consequently, the problem described above can be solved. In the sixth embodiment of the invention, a continuous mass emission rate measurement is carried out with using dehumidified flow rate, i.e., a flow rate that excludes the partial flow rate for water vapor in the total flow, and dehumidified gas concentrations. This technique eliminates the conversion of gas concentration from dehumidified to prehumidified condition and thus cancel the error associated with the conversion Examples of internal combustion engines according to the first through the seventh embodiments include motors and boilers in addition to automobile engines.

Figure 2:
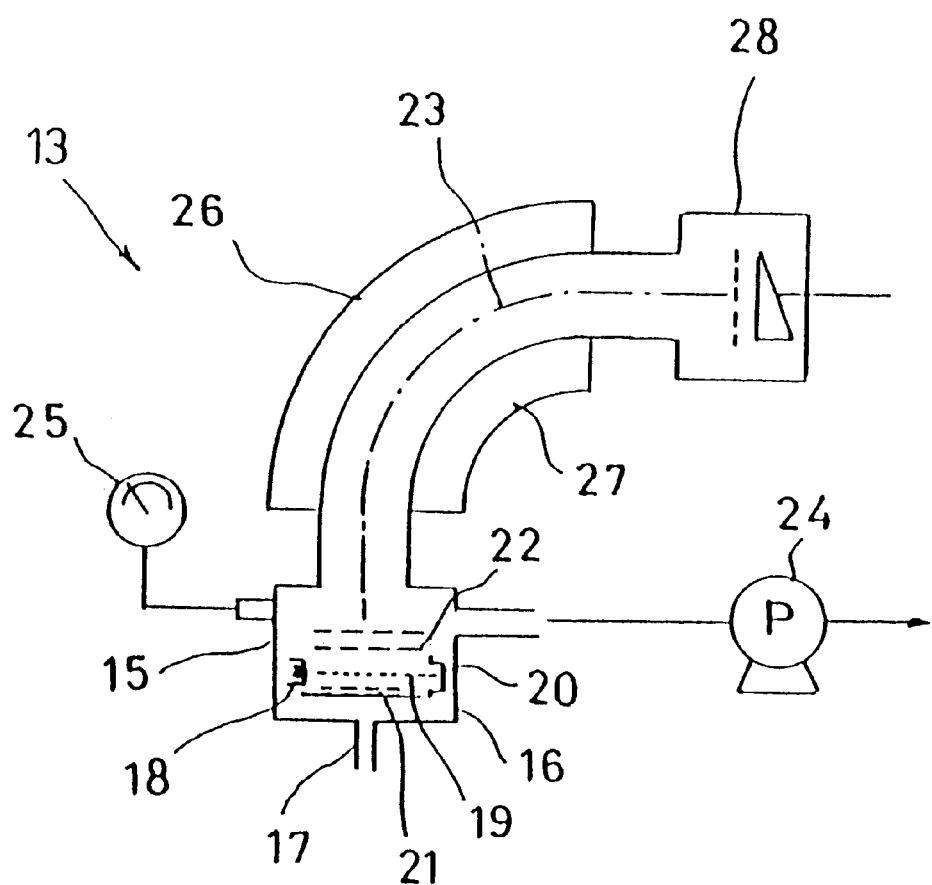
FIG. 2 schematically shows an exemplary trace gas analyzer for use with the measuring equipment.

FIG. 1 and FIG. 2 show a first configuration according to the first embodiment of the invention.

First of all, in FIG. 1, numeral 1 designates an automobile; numeral 2, an engine; numeral 3, and an exhaust passage linked to a tailpipe connected to the engine 2. This exhaust passage 3 comprises an exhaust pipe 3a (see, for example, FIG. 8 to FIG. 10). Numeral 4 designates a trace gas supply passage connected to an exhaust passage 3. Upstream of the trace gas supply path 4, a gas cylinder 5 containing pure helium gas as trace gas is installed. On the downstream side, a mass flow controller 6 that has both functions to measure and to control the gas flow rate is installed. The reason why helium gas is used as trace gas is that the atomic weight of helium of the substance existing in the exhaust gas is far different from that of the substance existing in the exhaust gas as compared to other inert gases such as argon.

Numeral 7 designates the gas sampling passage connected to the exhaust passage 3, which directly samples the exhaust gas undiluted with diluting gas such as air. To the gas sampling passage 7, for example, the equipment and apparatus as follows are connected. Numeral 8 designates a filter, numeral 9 designates a dehumidifier such as electronic cooling device, and numeral 10 designates a suction pump.

To the gas sampling passage 7 downstream of the suction pump 10, a plurality of gas analyzers 11 are installed via parallel branch passages 12 and are designed to properly measure components contained in the exhaust gas such as CO, $CO_2$, $NO_x$, or HC. At the same time, the trace gas analyzer 13 is connected to the gas sampling passage 7 via capillary 14 which as a suitable inside diameter. Examples of the tube include the capillary 14 comprising, for example, glass, with an inside diameter on the order of, for example, 0.03 mm to 0.05 mm. for the trace gas analyzer 13, for example, a Sectorfield mass spectrometer is used for measuring the concentration of helium gas, which is a trace gas. $E_x$ designates the exhaust gas which is not taken into the gas sampling passage 7 as sample gas S.

FIG. 1 shows that a configuration of continuous mass emission measurement comprising both gas analyzers and the trace gas analyzer is placed after a dehumidifier in order to introduce dehumidified sample to both analyzers and calculation of continuous mass emission rate is carried out using dehumidified gas concentration and dehumidified flow rate.

FIG. 2 schematically shows one example of the trace gas analyzer 13. In this figure, numeral 15 designates an ion source. Inside a container 16 held to high vacuum, a filament 18 and a collector electrode 20 for collecting electrons 19 generated when the filament 18 is heated are oppositely placed on the gas inlet 17 side which is coupled to the capillary 14. At the same time, ion press-out electrode 21, pull-out electrode 22, etc. are mounted to generate ions 23. Numeral 24 designates a exhaust pump for evacuating the container 16 to a high vacuum, and numeral 25 is a pressure gauge.

Numeral 26 designates an analyzer portion linked to the ion source 15 where a magnet 27 is installed to generate a magnetic field. The analyzer portion 26 is configured to allow only the helium ion to pass. Numeral 28 designates an ion collector for collecting ion 23 passing the analyzer portion 26. The oil current obtained at this ion collector 28 is displayed as data on a recorder, such as electromagnetic oscillograph or pen recorder, via a PRE AMP and MAIN AMP which are not illustrated. Signals output from a mass flow controller 6, gas analyzer 11, and trace gas analyzer 13 are designed to be input into a processor and control unit such a microcomputer, which are not illustrated.

In the exhaust gas analyzing equipment of the above-mentioned configuration, the exhaust gas from the engine 3 of an automobile 1 leads to the exhaust passage 2. The helium gas, whose flow rate is adjusted to this exhaust gas by the mass flow controller 6 on the upstream side of the exhaust passage 3 is introduced as trace gas. The introduction rate of this event is input to the processor and control unit.

A portion of the exhaust gas mixed with helium gas is taken into the gas sampling passage 7 as sample gas S. The sample gas S leads to the dehumidifier 9 via the filter 8, where it is dehumidified as required. After this dehumidifying treatment, the sample gas S is supplied to gas analyzers 11 mounted, respectively, to branch passages 12 in parallel to one another via the suction pump 10, as well as to the trace gas analyzer 13 via the capillary 14.

In the gas analyzer 11, various components contained in the sample gas S are analyzed, respectively, and the results are transmitted to the processor and control unit. In the trace gas analyzer 13, the concentration of helium gas is determined, and this concentration value is also transmitted to the processor and control unit.

On the other hand, in the mass flow controller 6, since the introduction rate of helium gas as trace gas is obtained, and this is sent to the processor and control unit, it is possible to obtain the exhaust gas flow rate in real time by dividing this helium gas introducing rate by the helium gas concentration.

As described above, because the exhaust gas flow rate measuring equipment of the internal combustion engine in the above-mentioned embodiments uses the capillary 14 for a member to connect the gas sampling passage 7 for directly sampling the exhaust gas from the engine 2 to the trace gas analyzer 13, it is not only possible to feed a specified flow rate of sample gas S to the trace gas analyzer 13, but the dead volume can be reduced as much as possible and the delay of response caused by this can also be reduced. Consequently, the time lag with measurement results in the gas analyzer 11 connected to the gas sampling passage 7 can be minimized.

Figure 3:
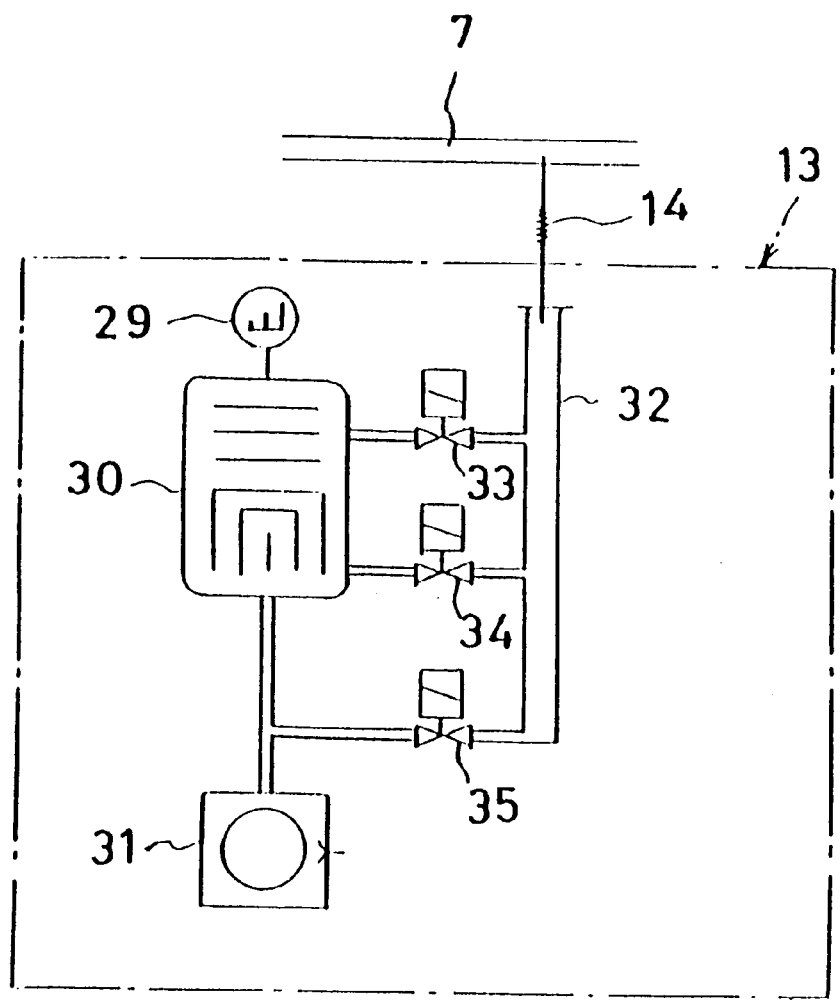
FIG. 3 shows a second configuration of the embodiment of the measuring equipment shown in FIG. 1.

FIG. 3 shows a second configuration according to the first embodiment of the invention, particularly showing another mode for taking the sample gas S into the trace gas analyzer 13. In FIG. 3, numeral 29 is a mass spectrometer to which a turbo-molecular/drag pump 30 and rotary pump 31 are connected in a series. Numeral 32 is a sampling port linked to the capillary 14. Numerals 33, 34 and 35 are open/close valves respectively and intermediately installed between the sample port 32 and the center position of the turbo molecular/drag pump 30, between the sample port 32 and the turbo molecular/drag pump 30 bottom, and between the sampling port 32 and the turbo molecular/drag pump 30 and the rotary pump 31.

In the equipment configured in this way, the following effects are achieved in addition to the effects of the above-mentioned embodiment. Pressure of the sampling port 32 is variable from a high negative pressure condition to atmospheric pressure. The mass spectrometer 29 changes over the open/close valves 33–35 at the inlet port leading to the chamber in accordance with the pressure changes. Because the relevant helium gases have a high diffusion coefficient, the helium molecule can move in a reverse direction in the turbo molecular/drag pump 30, while it prevents other gas components from entering the mass spectrometer 29. In addition, as described above, since the variable pressure range is wide, even if the capillary 14 of optional length is used, no error is generated in the measurement of the trace gas analyzer 3, which is very suitable for collecting samples of the exhaust gas.

In each of the above-mentioned configurations, helium gas as a trace gas is designed to mix into the exhaust gas flowing in the exhaust passage 3 downstream of the engine 2. However, according to a second embodiment of the invention, the trace gas supply passage 4 is connected to the engine 2 as shown with a virtual line 4' in FIG. 1. In this event, as compared to the above-mentioned configuration, the volume from the engine 2 to the tailpipe become a dead volume, increasing the time lag.

In each of the above-mentioned configuration, any inert gas other than helium gas may be used as a trace gas. For the trace gas analyzer 13, various mass spectrometers, such as a quadruple mass spectrometer, may be used in addition to the Sectorfield mass spectrometer.

Figure 4:
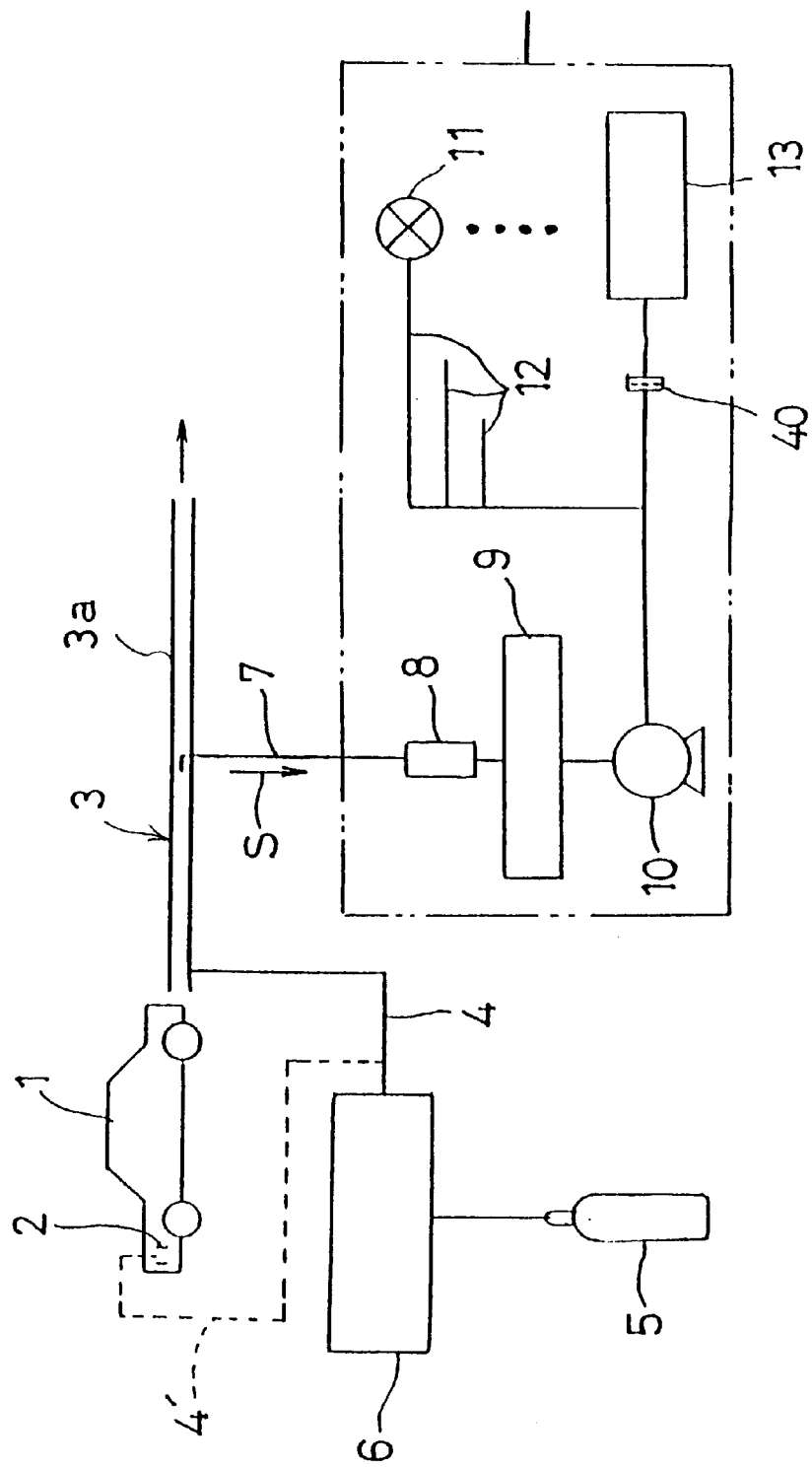
FIG. 4 schematically shows exemplary of the exhaust gas analyzing equipment incorporating an exhaust gas flow measuring equipment for the internal combustion engines in accordance with a third and the fourth embodiment of the invention.
Figure 5:
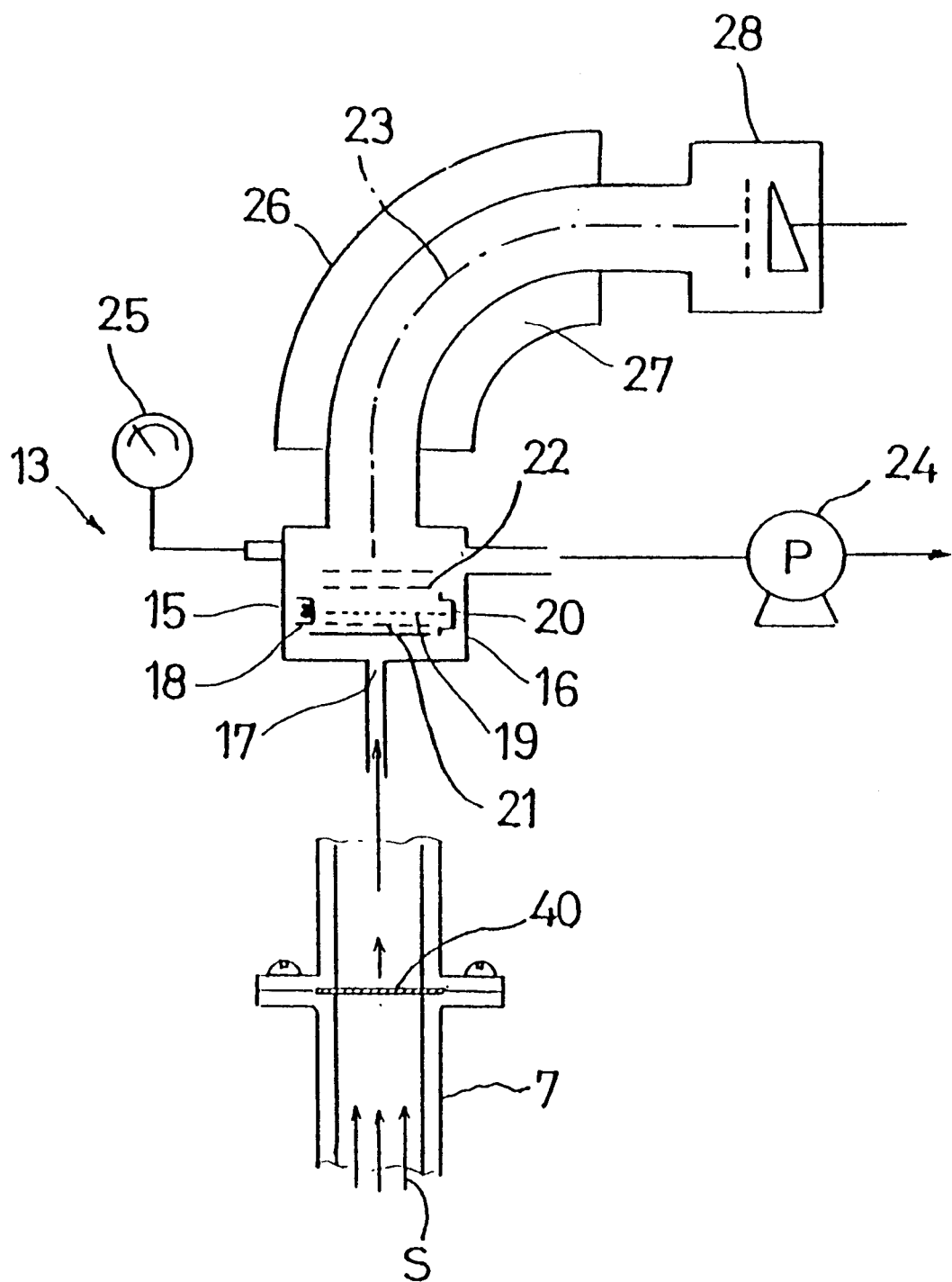
FIG. 5 schematically shows an exemplary trace gas analyzer for use with the measuring equipment shown in FIG. 4.

FIG. 4 and FIG. 5 show a first configuration according to a third embodiment of the invention in which the gas sampling passage 7 and the trace gas analyzer 13 are connected via a porous thin film 40 which preferably penetrates essentially inert helium gas as trace gas. In FIG. 4 and FIG. 5, like reference characters used in FIG. 1 and FIG. 2 designate like or corresponding parts throughout.

The porous thin film 40 may be made from polytetrafluoroethylene. The use of this material for the porous thin film 40 penetrates helium. This is assumed that the porous thin film 40 comprising polytetrafluorethylene prevents entry of unrequired exhaust gas components and supplies only helium gas to the trace gas analyzer 13.

Figure 6:
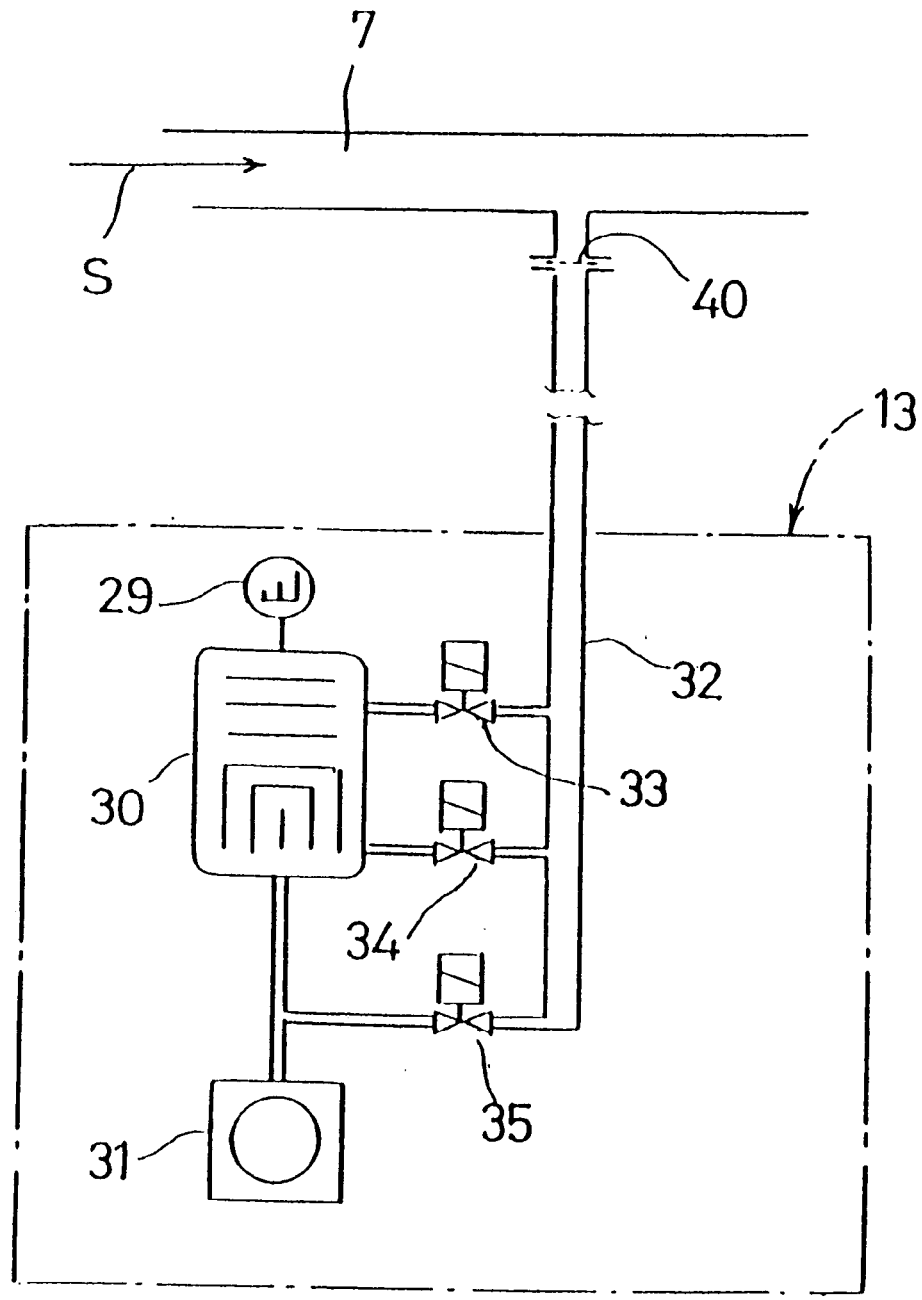
FIG. 6 shows a second configuration of the third and fourth embodiments of the gas analyzing equipment of FIG. 4.

FIG. 6 shows a second configuration of the third embodiment of the invention and indicates another mode of taking the sample gas S into the trace gas analyzer 13 when the porous thin film 40 is used. In FIG. 6, like reference characters used in FIG. 1 through FIG. 5 designate like or corresponding parts throughout.

FIG. 7 through FIG. 10 show a first configuration according to a fifth embodiment of the invention. In FIG. 7 through FIG. 10, like reference characters used in FIG. 1 through FIG. 6 above designate like or corresponding parts throughout.

Figure 7:
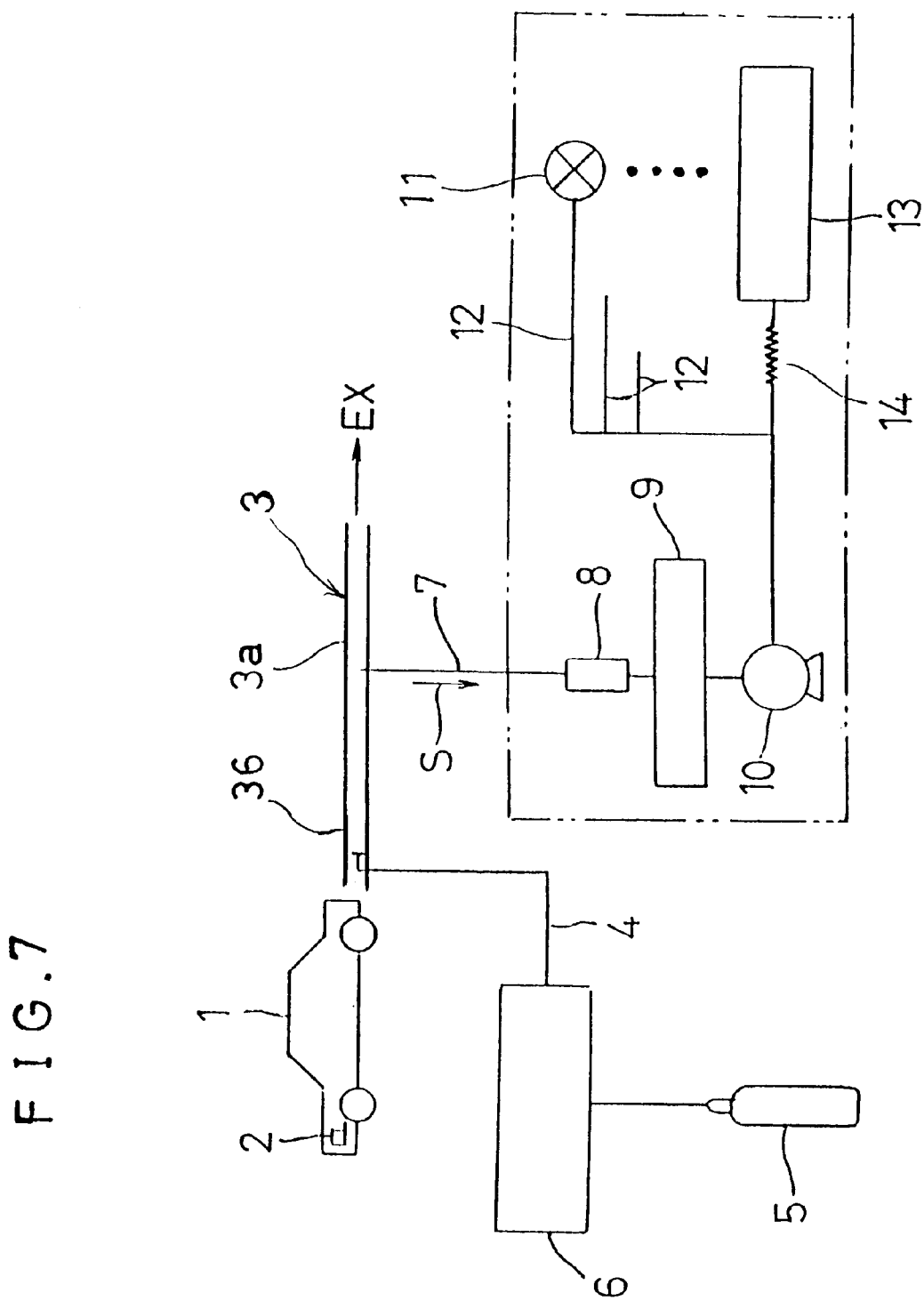
FIG. 7 schematically shows exemplary exhaust gas flow rate measuring equipment for the internal combustion engines in accordance with a first configuration of a fifth embodiment of the invention.
Figure 8:
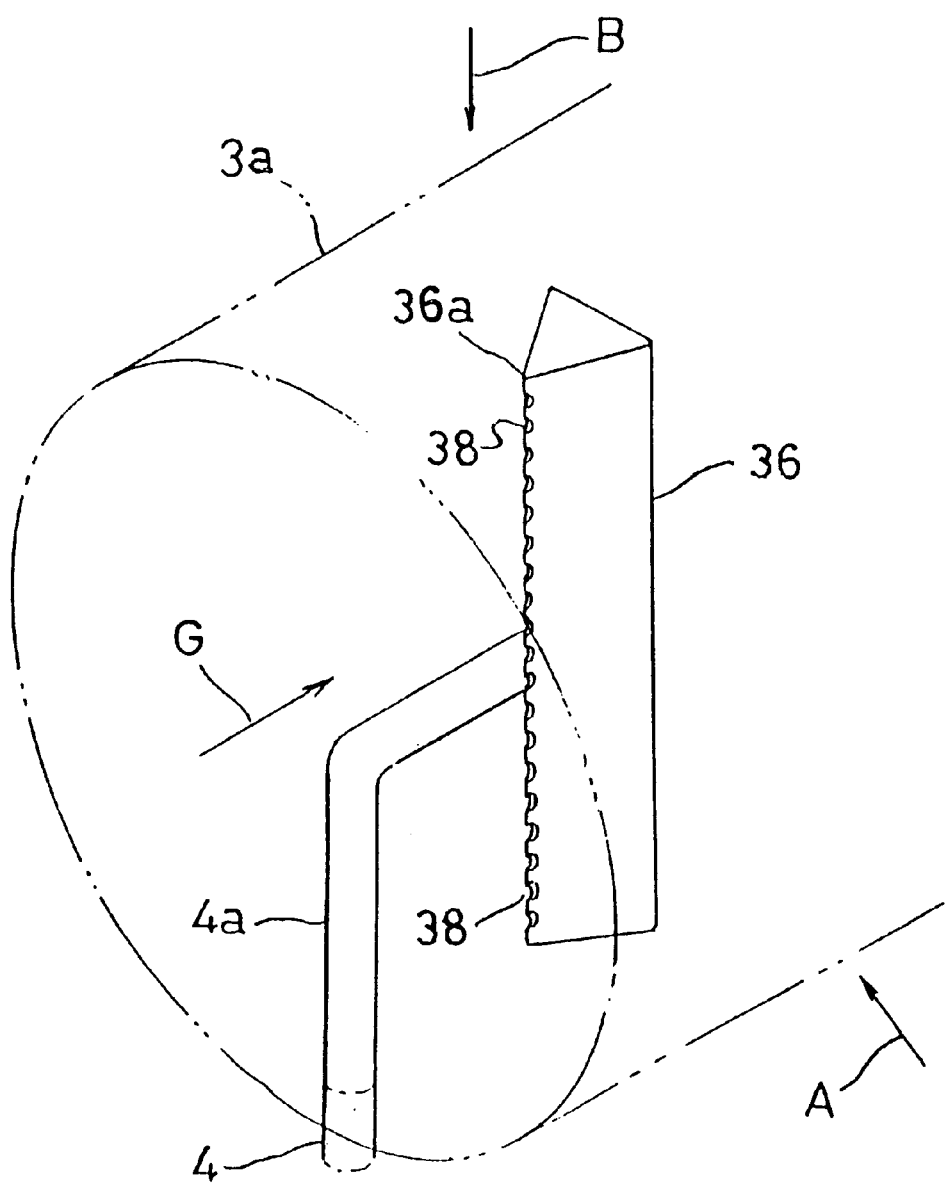
FIG. 8 is a perspective view which shows an enlarged view of a trace gas introducing portion in the exhaust gas flow rate measuring equipment shown in FIG. 7.
Figure 9A:
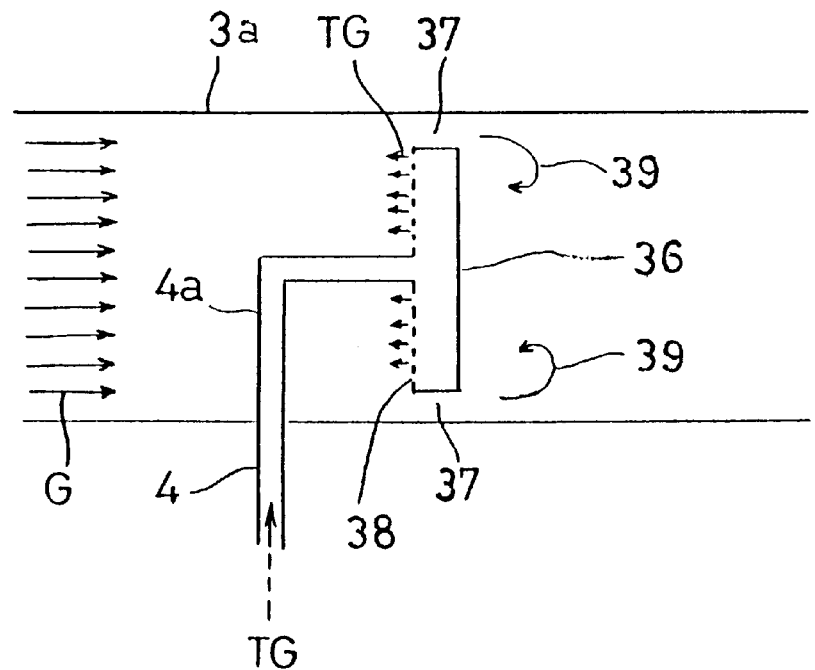
FIG. 9a schematically shows the trace gas introducing portion of FIG. 8 as seen along arrow A.
Figure 9B:
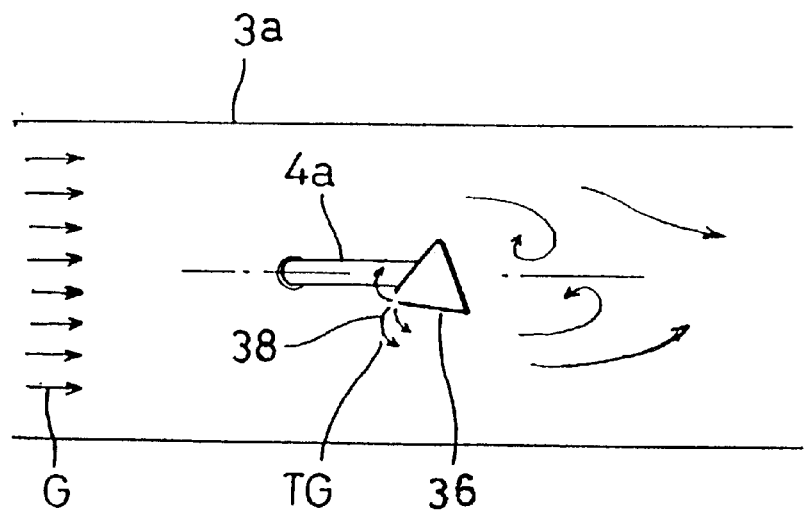
FIG. 9b schematically shows the trace gas introducing portion of FIG. 8 along arrow mark B.

FIG. 7 through FIG. 9 show one example of the configuration for introducing the helium gas TG into the exhaust pipe 3a as trace gas. FIG. 8 is a perspective view of the relevant portion; FIG. 9a is a schematic representation as seen from the arrow A direction in FIG. 8; and FIG. 9b is a schematic representation as seen from the arrow B direction (which is perpendicular to arrow A) in FIG. 8. FIG. 10 schematically shows the blowout condition of helium gas TG.

In FIG. 8 and FIG. 9, numeral 4a designates a head end portion of the trace gas introducing pipe 4, which is inserted in the exhaust pipe 3a, and the top end portion 4a is bent in an L-shape along the flow of the exhaust gas G. A tube is placed at the top end portion 4afor blowing out the trace gas. The tube 36 has an outer triangular profile and an inner gas passage is placed to cause its longitudinal direction to cross the direction the exhaust gas G is flowing at right angles. Both end portions of the inner passage are separated at a suitable distance from the inner wall of the exhaust pipe 3a, with numeral 37 indicating a clearance between the end portions and the inner wall of the exhaust pipe 3a.

The cylinder 36 has an asymmetrical triangular cross-sectional profile as seen from the direction of arrow B as shown in FIG. 9b and FIG. 10. One of the vertices 36a is located on the upstream side (the direction in which exhaust gas G flows). A plurality of holes 38 for trace gas blow-out are opened in the longitudinal direction to the vertex 36a. The head end portion 4a of the trace gas introducing pipe 4 is connected to one of the outer surfaces of the cylinder 36 in free communication. The cylinder 36 is heated by a heater (not illustrated), and the temperature is controlled so that the temperature difference between the exhaust pipe 3a and the exhaust gas G is located in a specified range.

In the equipment of the above-mentioned configuration, the exhaust gas from the engine 2 of the automobile 1 leads to the exhaust pipe 3a. On the upstream side of the exhaust pipe 3a, helium gas TG, whose flow rate is adjusted by the mass flow controller 6, leads to the tube 36 via the trace gas introducing pipe 4. From the blow out hole 38 of the tube 36, exhaust gas is blown out into the exhaust pipe 3a and introduced into the exhaust pipe 3a. The introduction rate at this moment is measured by the mass flow controller 6 and input to the processor and control unit.

As the tube 36 which is asymmetric to the flow of the exhaust gas G is installed in the exhaust pipe 3a in such a manner that both end portions in the longitudinal direction do not come in contact with the inner wall of the exhaust pipe 3a (as schematically shown in FIG. 10), a turbulence occurs in the exhaust gas G at the downstream side of the tube 36, and helium gas TG blown out to the exhaust pipe 3a via the blow out hole 38 opened on the upstream side of the tube 36 is thoroughly mixed with the exhaust gas G in the turbulent condition. While helium gas TG is being blown out from the glow out hole 38 installed upstream of the tube 36, the exhaust gas G generates a turbulence downstream of the tube 36 by the tube 36 being installed asymmetrically to the flow of the exhaust gas G. At the same time, the exhaust gas G passing through the slight clearance between the tube 36 and the exhaust pipe 3a flows to the center direction of the exhaust pipe 3a, thereby generating an eddy 39 as shown in FIG. 9a. The exhaust gas G is thus thoroughly mixed with helium gas TG. In this event, pressure loss caused by the blow out of the helium gas TG and the flow rate fluctuation of helium gas TG are little, and the flow rate can be easily controlled.

As described above, a portion of the exhaust gas G thoroughly mixed with the helium gas TG is taken into the gas sampling passage 7 as sample gas S. The sample gas S taken into the gas sampling passage 7 leads to the dehumidifier 9 via the filter 8 and is dehumidified as required. The sample gas S after this dehumidifying treatment is supplied to the gas analyzers 11 installed, respectively, to the branch passages 12 in parallel to one another via the suction pump 10, and at the same time supplied to the trace gas analyzer 13 via the capillary 14.

In the gas analyzer 11, various kinds of components contained in the sample gas S are analyzed, respectively, and the results are transmitted to the processor and control unit. At the trace gas analyzer 14, the concentration of helium gas TG is determined, and this concentration value is also transmitted to the processor and control unit.

As in the mass flow controller 6 the introduction rate of helium gas TG as trace gas is obtained and as this is transmitted to the processor and control unit, by dividing this helium gas introducing rate by the helium gas concentration it is possible to obtain the exhaust gas flow rate in real time.

In the above-mentioned embodiment, the cross-sectional profile of the tube 36 is asymmetrically triangular and the tube 36 is installed asymmetrically to the flow of the exhaust gas G. The cross-sectional profile of the tube 36 may be symmetric as, for example, an isosceles triangle, and the tube 36 with a symmetrical cross-sectional profile may be installed asymmetrically or symmetrically to the flow of the exhaust gas G. The position of the blow-out hole 38 in the tube 36 may not be limited to the upstream side of the tube 36 but may be located at any suitable position such as at the downstream side or on the side.

As described above, the first configuration according to the fifth embodiment of the invention has a triangular cross-sectional profile of the tube 36, but this fifth embodiment shall not be limited to this but may be formed as a quadrangle or a hexagon. Referring now to FIG. 11 and FIG. 12, description will be made on these.

Figure 11A:
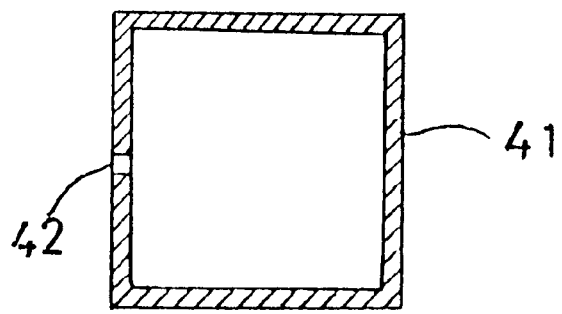
FIG. 11a is a cross-sectional view of the another embodiment of the equipment shown in FIG. 7.
Figure 11B:
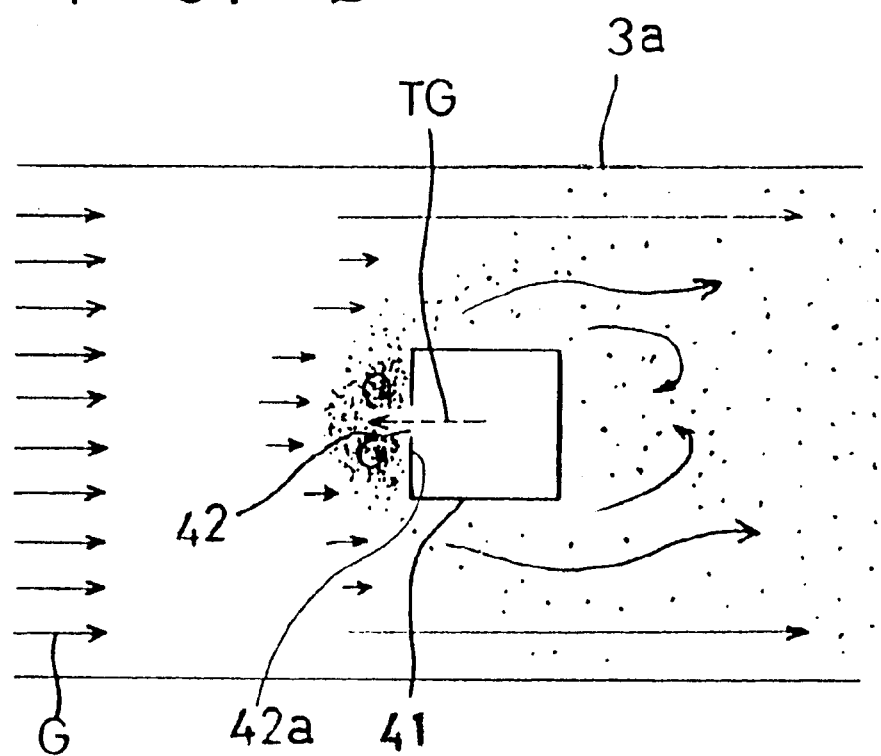
FIG. 11b schematically illustrates an operation of the embodiment of the equipment shown in FIG. 7.
Figure 12:
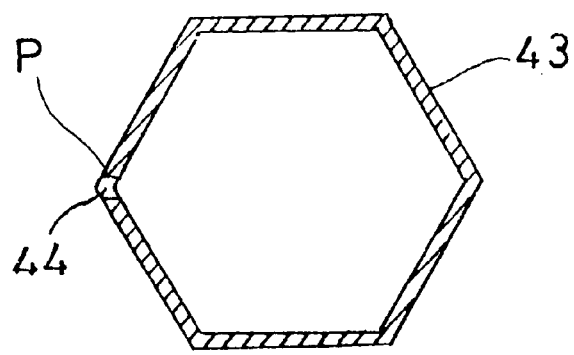
FIG. 12 is a cross-sectional view of a third configuration of a fifth embodiment of the fifth invention.

First of all, FIG. 11 shows the second configuration according to the fifth embodiment. In FIG. 11a, numeral 41 designates a tube with a suitable length and a cross-sectional profile of a quadrangle, more specifically, a square. On one side of this tube 41, though it is not illustrated in detail, a plurality of blow-out holes 42 are opened in the longitudinal direction. This kind of tube 41 is placed symmetrically to the flow of the exhaust gas G so that the side 42a forming the blow-out hold 42 is located on the upstream side as shown in FIG. 11b. It is preferable for both end portions of tube 41 not to contact the inner wall of the exhaust pipe 3a.

In this way, in the tube 41 whose cross-sectional profile is a square, as shown in FIG. 11b, a turbulence is generated in the exhaust gas G downstream of the tube 41. The helium gas TG blown out to the exhaust pipe 3a via the blow-out hole 42 opened upstream of the tube 41 is thus thoroughly mixed with the exhaust gas G in the turbulent condition. While the helium gas TG is blown out from the blow-out hole 42 located upstream of the tube 41, the exhaust gas G generates a turbulence downstream of the tube 41 by the tube 41 being arranged asymmetrically to the flow of the exhaust gas G. The exhaust gas G passing through the slight clearance between the tube 41 and the exhaust pipe 3a flows to the center direction of the exhaust pipe 3a, thereby generating an eddy as in the case of FIG. 9a. The exhaust gas G and helium gas TG are therefore thoroughly mixed. And in this case, pressure loss caused by the blow out of the helium gas TG and the flow rate fluctuation of the helium gas TG are little, and the flow rate can be easily controlled.

In the second configuration according to the fifth embodiment of the invention, the tube 41 may be arranged to by asymmetrical to the flow of the exhaust gas G. The cross-sectional profile of the tube 41 may be a rectangle or a trapezoid, or further a simple quadrangle. In the case of the tube 41 having a with rectangular cross-sectional profile, the tube 41 is preferably arranged to be symmetrical to the flow of the exhaust gas G. The position of the blow-out hole 42 in the tube 41 shall not be limited to the upstream side of the tube 41 but may be located at a suitable position on the downstream side or on the side.

FIG. 12 shows the third configuration in the fifth embodiment of the invention. In FIG. 12, numeral 43 is a tube whose cross-sectional profile is a regular hexagon. At one vertex P of this tube 43, a plurality of low out holes 44 are opened in the longitudinal direction. The tube 43 configured in this way is placed in the exhaust pipe 3a so that the blow out hold 44 is located on the upstream side. The action and the effect when arranged in this way are the same as those of the first or the second configurations of the fifth embodiment of the invention, and their detailed explanation will be omitted. In this third configuration, the tube 43 may be arranged to be asymmetrical to the flow of the exhaust gas G. For the cross-sectional profile of the tube 43, it may be a simple hexagon. In addition, the position of the blow out hole 44 in the tube 43 is not limited to the upstream side of the tube 43 but may be located at any position such as on the downstream side or on the side.

Figure 23:
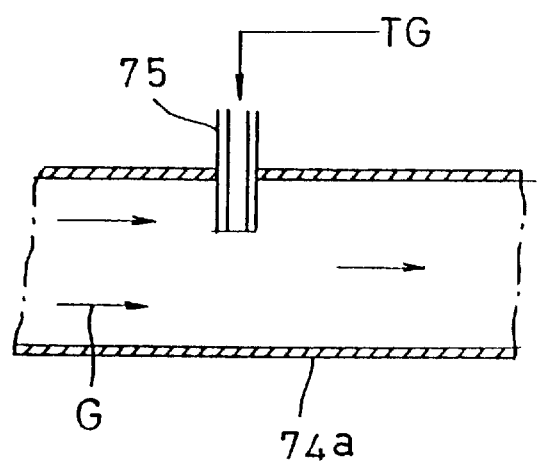
FIG. 23 is a cross-sectional view of conventional apparatus.

In the first through the third configurations of the fifth embodiment of the invention, the cross-sectional profiles of the tubes 36, 41 and 43 are designed to be a triangle, quadrangle, and hexagon, respectively, because of ease of fabrication of these profiles. For the tube, the cross-sectional profile may be a polygon larger than a septangle, but for this kind of profile, as compared to the conventional technique shown in FIG. 23, a turbulence is likely to occur, and helium gas TG can be thoroughly mixed with the exhaust gas G; however it is assumed that those profiles described in each of the above configurations achieve better mixing effects.

Figure 13:
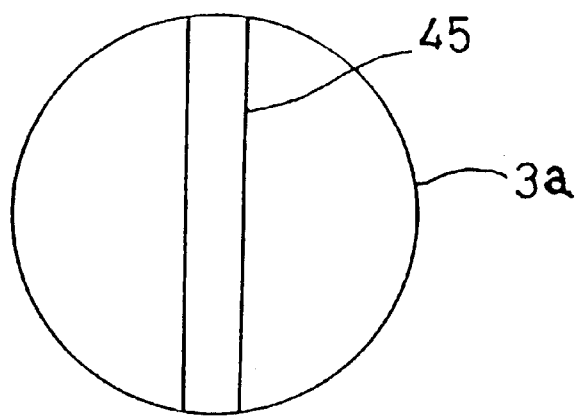
FIG. 13 shows an alternative locating form of the housing according to the fifth embodiment of the invention.

In each of the configurations described above of the fifth embodiment of the invention, the tube 36, 41 and 43 is arranged to form a slight clearance between the both end portions in the longitudinal direction of the inner wall of the exhaust pipe 3a. But as shown in FIG. 13, both end portions of the tube 45 may be designed to come in contact with the inner wall of the exhaust pipe 3a. In this event, on the inner wall dies of the exhaust pipe 3a, Lancaster eddies are difficult to be generated, and the turbulent effects slightly decrease. However, helium gas TG can be thoroughly mixed with the exhaust gas G.

FIG. 14 through FIG. 18 show simulation results using a computer of the condition when the trace gas TG is mixed into the exhaust gas G in each of the above configurations of the fifth embodiment of the invention. In the following description, the inside diameter of the exhaust pipe 3a is assumed to be 53 mm, the flow rate of the exhaust gas G flowing in the pipe 3a is assumed to be 2,000 1l/min, and the Reynolds number is assumed to be constant. Reference characters a through i in each figure show the area classified by the flow velocity, with reference character "a" indicating the fastest area, with the flow velocity decreasing stepwise thereafter.

Figure 14A:
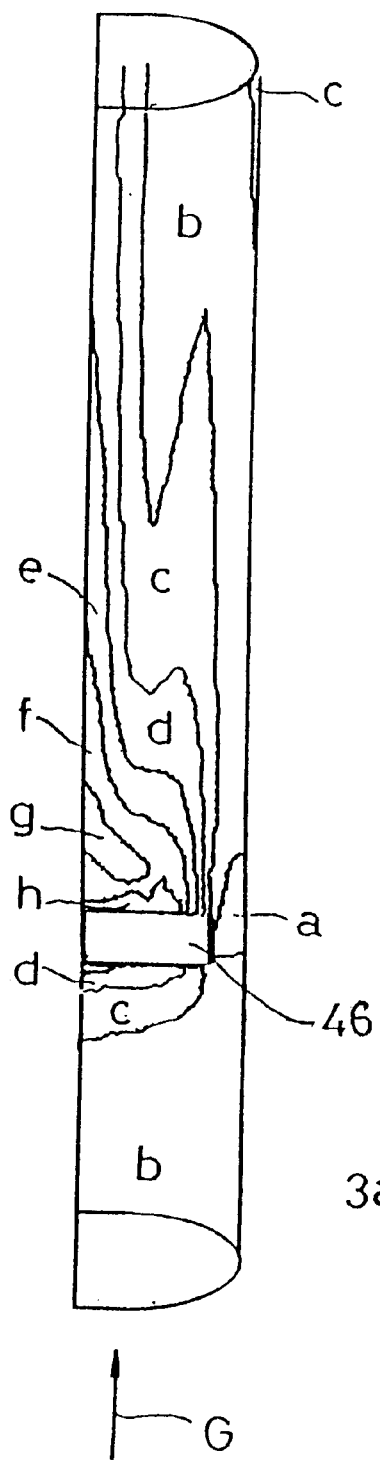
FIG. 14a shows a simulation indicating a mixing condition of the exhaust gas and trace gas when a triangular pole is arranged in the fifth embodiment of the invention.
Figure 14B:
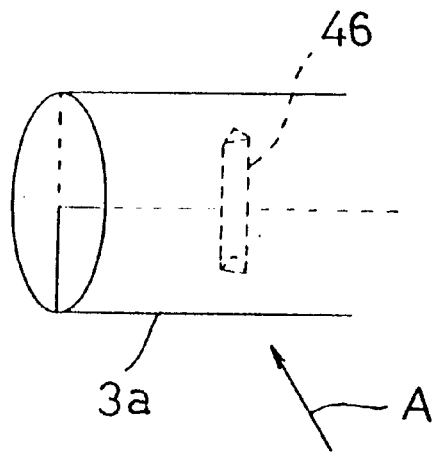
FIGS. 14b and 14c schematically show an arrangement of the triangular pole shown in FIG. 14(a)
Figure 14C:
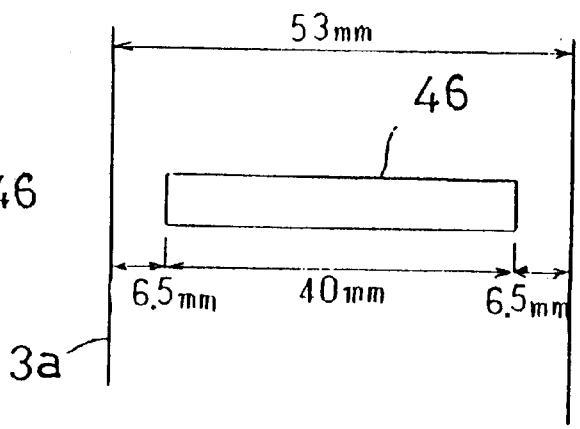

FIG. 14a shows a simulation indicating the mixing condition of the exhaust gas G and the trace gas TG around a 40 mm long triangular pole 46 when the triangular pole 46 is positioned in such a manner that both end portions do not come in contact with the inner wall of the exhaust pipe 3a as shown in FIGS. 14b and 14c. Only one half of the cylindrical exhaust pipe 3a is shown.

Figure 15A:
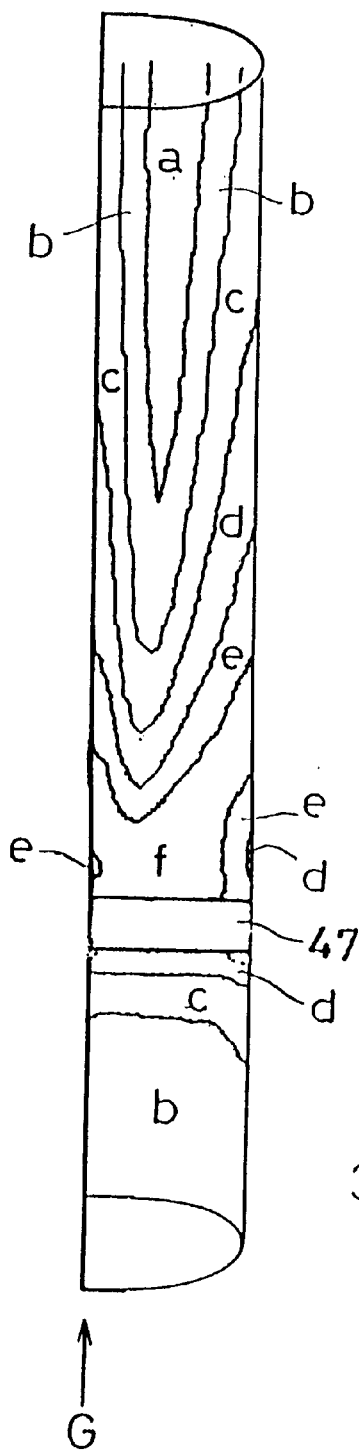
FIG. 15a shows a simulation indicating other mixing conditions of the exhaust gas and trace gas when a triangular pole is arranged in the fifth embodiment of the invention.
Figure 15B:
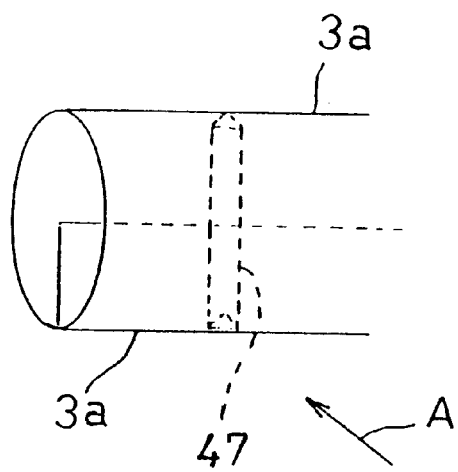
FIGS. 15b and 15c schematically show other arrangement conditions of other triangular poles in the fifth embodiment of the invention.
Figure 15C:
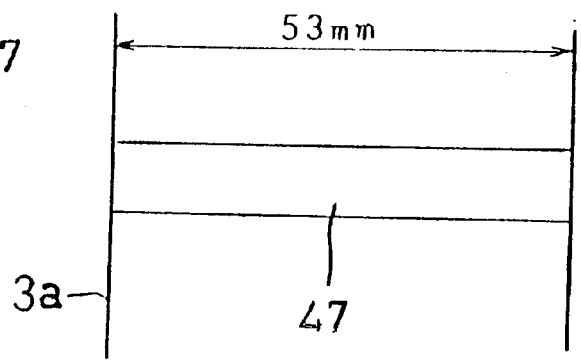

FIG. 15a shows a simulation indicating the mixing condition of the exhaust gas G and the trace gas TG around a triangular pole 47 when a 53 mm long triangular pole 47 is positioned in such a manner that both end portions come in contact with the inner wall of the exhaust pipe 3a and are arranged to be asymmetrical to the flow of the exhaust gas G as shown in FIGS. 15b and 15c.

Figure 16A:
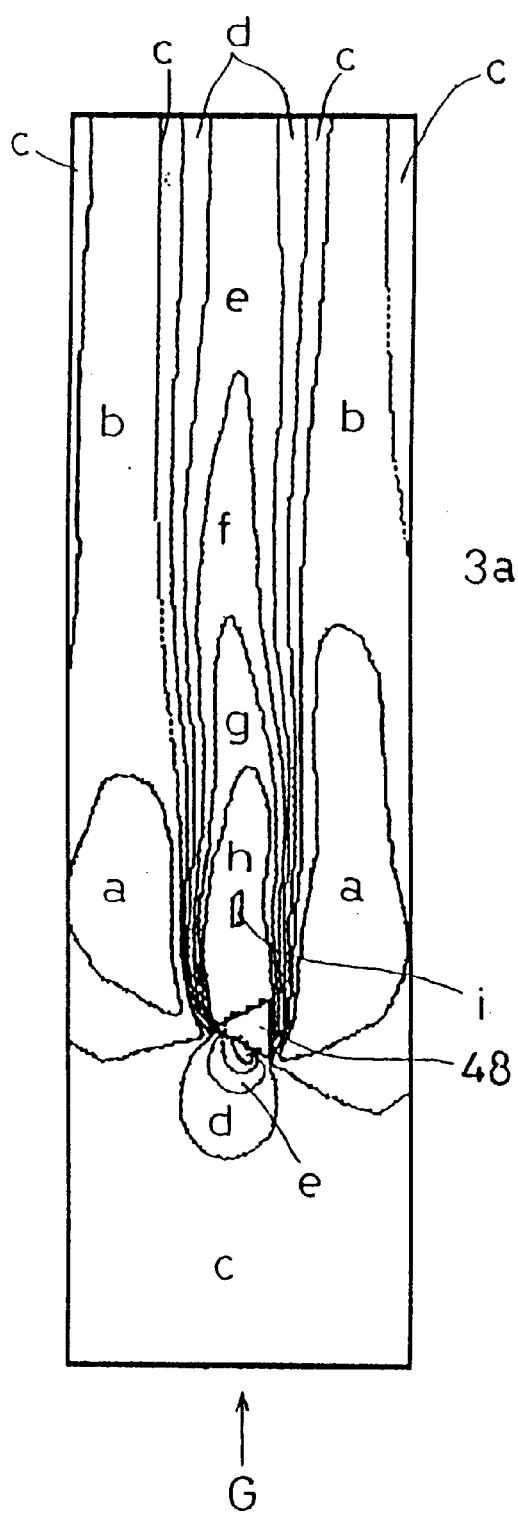
FIG. 16a shows a simulation indicating other mixing condition of the exhaust gas and trace gas when a triangular pole is arranged in the fifth embodiment of the invention.
Figure 16B:
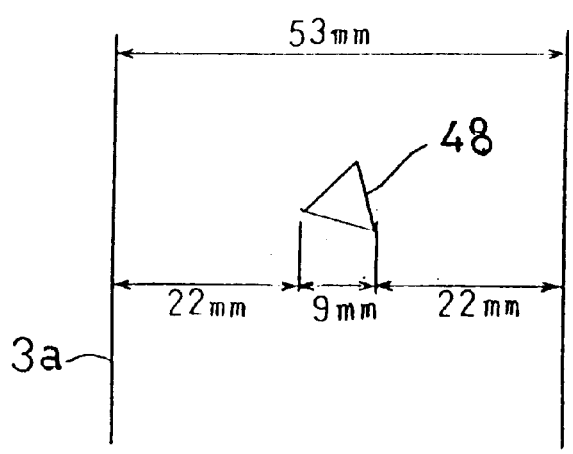
FIG. 16b schematically shows an arrangement of the triangular poles in the fifth embodiment of the invention.

FIG. 16a is a simulation indicating the mixing condition of the exhaust gas G and the trace gas TG around a triangular pole 48 when a 53 mm long triangular pole 48 whose cross-sectional profile is an isosceles triangle is positioned in such a manner that both end portions come in contact with the inner wall of the exhaust pipe 3a and are arranged to be asymmetrical to the flow of the exhaust gas G, as shown in FIG. 16b.

In addition, FIG. 17a is a simulation indicating the mixing condition of the exhaust gas G and the trace gas TG around a triangle pole 49 when a 53 mm long triangular pole 49 whose cross-sectional profile is an equilateral triangular is positioned in such a manner that both end portions come in contact with the inner wall of the exhaust pipe 3a and are arranged to be symmetrical to the flow of the exhaust gas G, as shown in FIG. 17b.

Figures 18A, 18B:
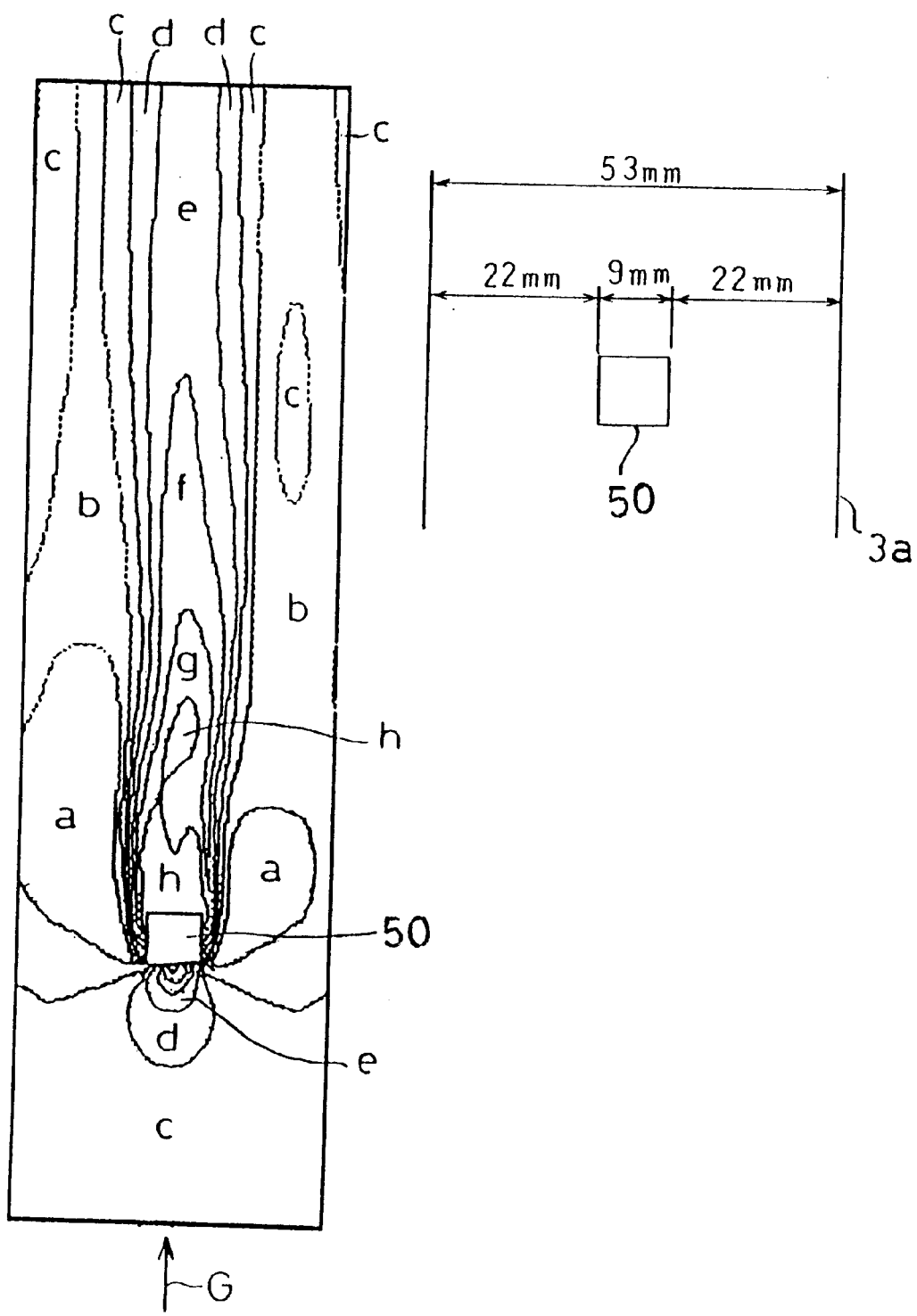
FIG. 18a shows a simulation indicating the mixing condition of the exhaust gas and trace gas when a quadrangular pole is arranged in the fifth embodiment of the invention.
FIG. 18b schematically shows an arrangement of the quadrangular pole in the fifth embodiment of the invention.

Furthermore, FIG. 18a is a simulation indicating the mixing condition of the exhaust gas G and the trace gas TG around a square pole 50 when a 53 mm long square pole 50 whose cross-sectional profile is square is positioned in such a manner that both end portions come in contact with the inner wall of the exhaust pipe 3a and are arranged to be symmetrical to the flow of the exhaust gas G, as shown in FIG. 18b.

In FIG. 14 through FIG. 17 above, the blow-out hole of the trace gas TG is assumed to be located at the vertex on the upstream side, while in FIG. 18, it is assumed to be located on the side on the upstream side.

FIG. 14a and FIG. 15a show the flow velocity distribution when the triangular poles 46, 47 are respectively positioned not in contact and in contact with the inner wall of the exhaust pipe 3a. The mixing of the exhaust gas G and the trace gas TG is enhanced when the tube 46 is positioned not in contact with the inner wall of the exhaust pipe 3a. This is assumed to be similar not only when the tube cross-section is triangular but also when it is shaped as other polygons.

FIG. 16a, FIG. 17a, and FIG. 18a show the flow velocity distribution when the cross-sectional profile of the triangular poles 48, 49, and the quadrangle pole 50 are positioned to be symmetrical or asymmetrical to the flow of the exhaust gas G in the exhaust pipe 3a. As shown by these figures, the mixing of the exhaust gas G and the trace gas TG is promoted or enhanced when the cross-sectional profile is positioned asymmetrically. The mixing can be enhanced to a greater degree with the tube 50 whose cross-sectional profile is a quadrangular pole than with the tube 48, 49 with a triangular pole cross-sectional profile. However, the pressure loss increases upstream with respect to the flow of the exhaust gas G.

This fifth embodiment of the invention shall not be limited to each of the embodiments described above. For example, for the trace gas, inert gases other than helium gas may be used, but helium gas is preferable. This is because the atomic weight of helium is far different from that of the substance existing in the exhaust gas G. For the trace gas analyzer 13, various mass spectrometers, such as a quadruple mass spectrometer, may be used in addition to the Sectorfield mass spectrometer.

Figure 19:
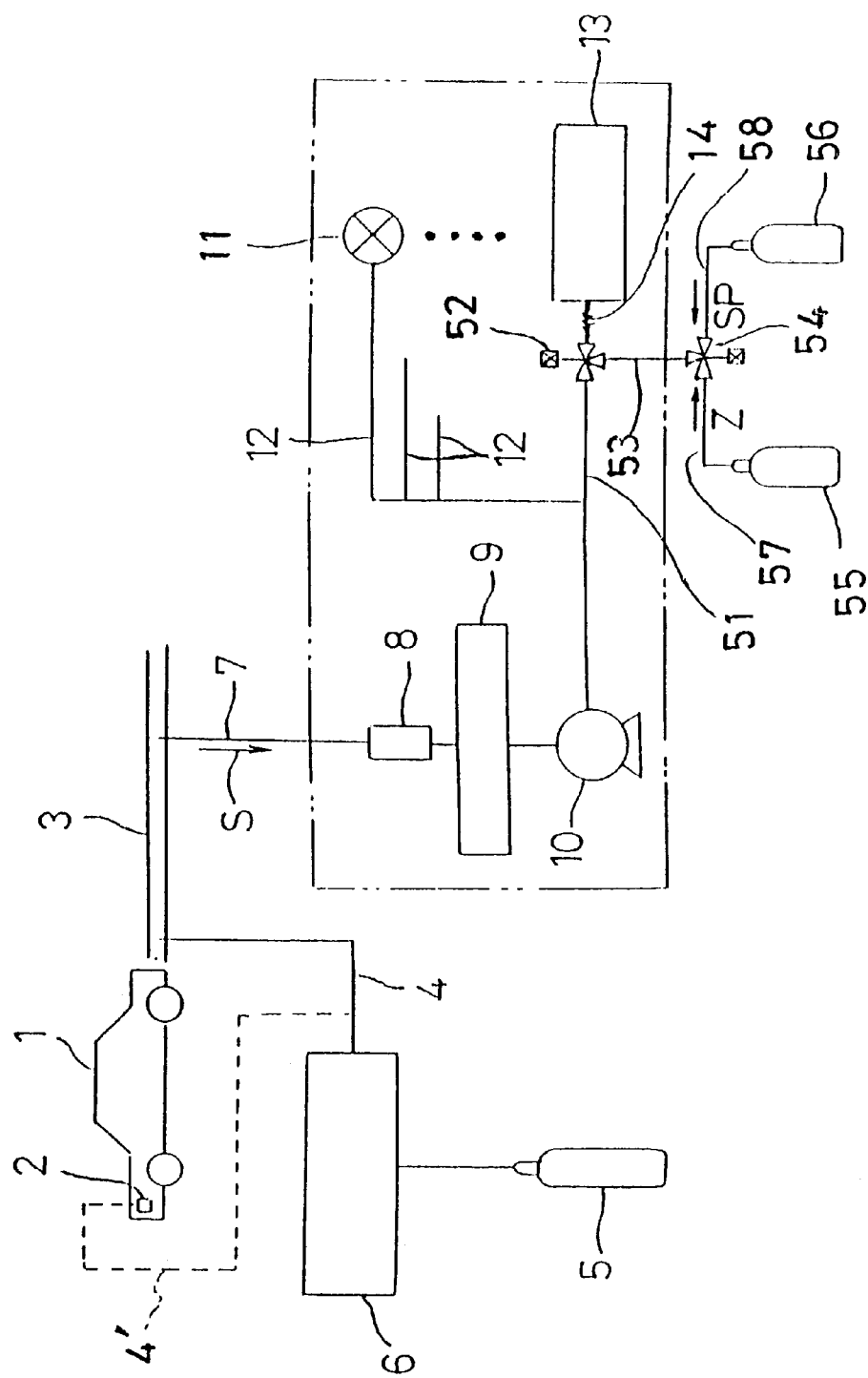
FIG. 19 schematically shows one example of the exhaust gas analyzing equipment to which a sensitivity calibration process of a trace gas flow meter according to sixth and seventh embodiments of the invention is applied.
Figure 20:
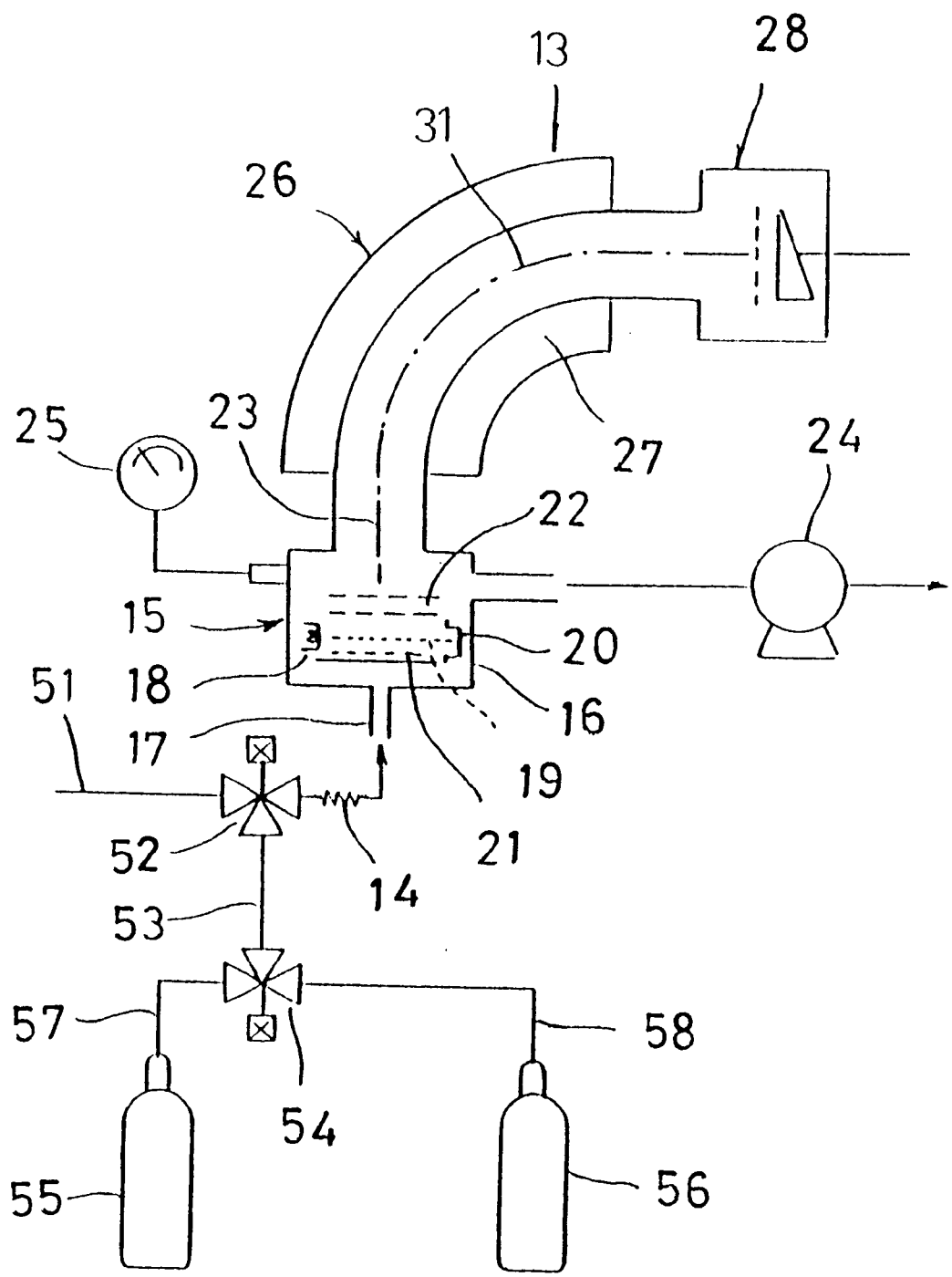
FIG. 20 schematically shows one example of the trace gas analyzer used for the exhaust gas analyzing equipment shown in FIG. 19.

FIG. 19 and FIG. 20 schematically show one example of the exhaust gas analyzing equipment to which the sensitivity calibration process of the trace gas flow meter according to the sixth embodiment of the invention may be applied. In FIG. 19 and FIG. 20, like reference characters designate like or corresponding parts throughout.

In FIG. 19 and FIG. 20 a plurality of gas analyzers 11 are installed to the gas sampling passage 7 downstream of the suction pump 10 via branch passages 12 connected in parallel to one another. The gas analyzers 11 are configured to suitably measure the component contained in the exhaust gas, such as CO, $CO_2$, $NO_x$, or HC, while the trace gas analyzer 13 is connected to the downstream end of the branch passage 51 in parallel to the branch passage 12.

Numeral 52 is a passage selector valve comprising, for example, a three-way solenoid valve, located at the branch passage 51. The trace gas analyzer 13 is connected to one port of the valve 52 via the capillary 14 with a 30 $\mu$m inside diameter. A calibration gas supply passage 53 is connected to the other port of the valve 52. At the end portion of the calibration gas supply passage 53, a passage selector valve 54 comprising, for example, a three-way solenoid valve is connected. Gas cylinders 55, 56 containing zero gas and span gas, respectively, are connected to the selector valve 54 via the passages 57, 58, respectively.

For the zero gas Z and the span gas SP contained in the cylinders 55, 56, respectively, the gas mixed with $CO_2$ contained in a large quantity compared with $N_2$ in the exhaust gas of automobile 1 at the concentration level similar to that in the exhaust gas is used. For the zero gas Z, with $N_2$ used as a base, the gas mixed with $CO_2$ in such a manner that the concentration becomes about 15% is used. For the span gas SP, with $N_2$ used as a base gas, to which some tens of to ten thousand of parts per million (ppm) of helium are added and the gas mixed with $CO_2$ in such a manner that the concentration becomes about 15%, is used.

Therefore, when the exhaust gas flow rate is analyzed, the passage selector valve 52 is operated, and the branch passage 51 is brought to be in free communication with the capillary 14. On the upstream side of the exhaust passage 3, helium gas whose flow rate is adjusted by the mass flow controller 6 is introduced to the exhaust gas as the trace gas. The introduction rate in this event is inputted to the processor and control unit.

A portion of the exhaust gas with helium gas is taken into the gas sampling passage 7 as sample gas S. The sample gas S taken into the gas sampling passage 7 leads to the dehumidifier 9 via the filter 8 and is dehumidified as required. After this dehumidifying treatment, the sample gas S is supplied to the gas analyzer 11 mounted to the parallel branch passages 12 via the suction pump 10. At the same time, the sample gas is also supplied to the trace gas analyzer via the branch passage 51, passage selector valve 52, and capillary 14.

In the gas analyzer 11, various components contained in the sample gas are analyzed, respectively, and the results are transmitted to the processor and control unit. In the trace gas analyzer 13, the concentration of helium gas is determined, and this concentration value is also transmitted to the processor and control unit.

In the mass flow controller 6, the introduction rate of helium gas as trace gas is obtained. As the introduction rate is transmitted to the processor and control unit, by dividing this helium gas introduction rate by the helium gas concentration, it is possible to obtain the exhaust gas flow rate in real time.

Next, when the trace gas analyzer 13 is calibrated, the passage selector valve 52 is operated to bring the calibration gas supply passage 53 in free communication with the capillary 14. The passage selector valve 54 is operated to supply the zero gas Z containing about 15% of $CO_2$ (with $N_2$ used as base) to the trace gas analyzer 13 via the calibration gas supply passage 53, passage selector valve 52, and capillary 14. The required zero point calibration can, thereby, be carried out. The passage selector valve 54 is then operated to supply the span gas SP with several tens of to several thousands of ppm helium gas added (with $N_2$ used as base, to which $CO_2$ is mixed to achieve about 15% concentration), to the trace gas analyzer 13 via the calibration gas supply passage 53, passage selector valve 52, and capillary 14. The required span calibration can, thereby, be carried out.

Figure 21:
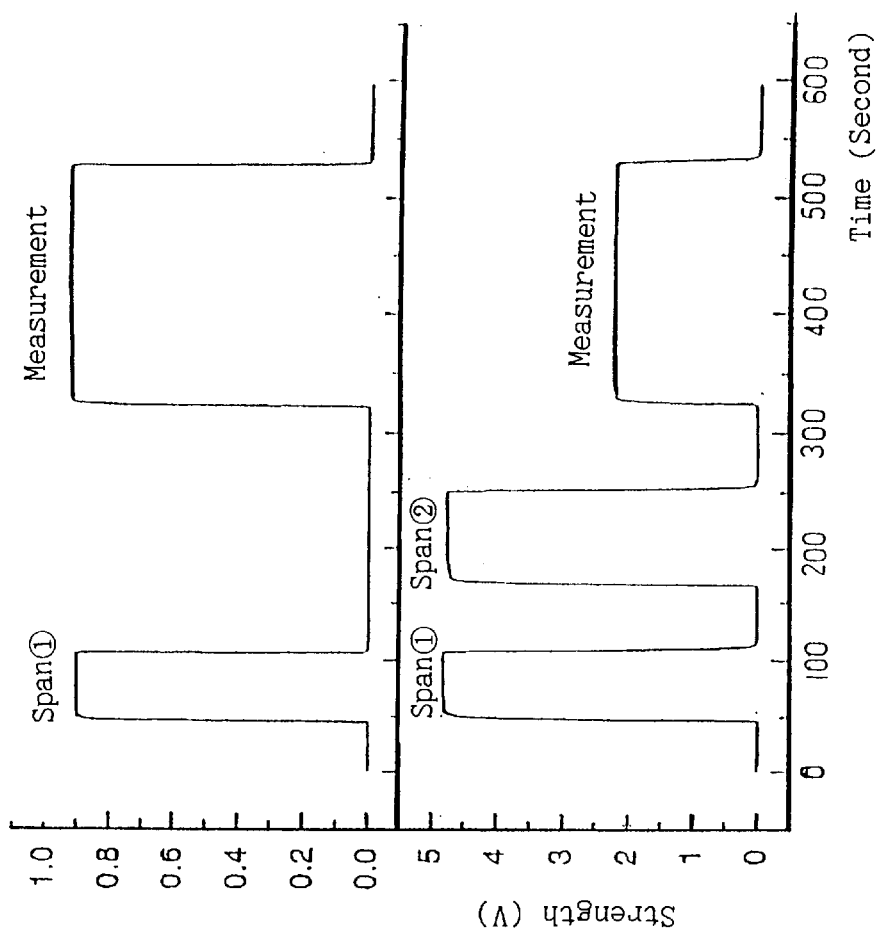
FIG. 21 shows an output of the analyzer when $CO_2$ is mixed in span gas and when $CO_2$ is not mixed in the sixth and the seventh embodiment of the invention.
Figure 22:
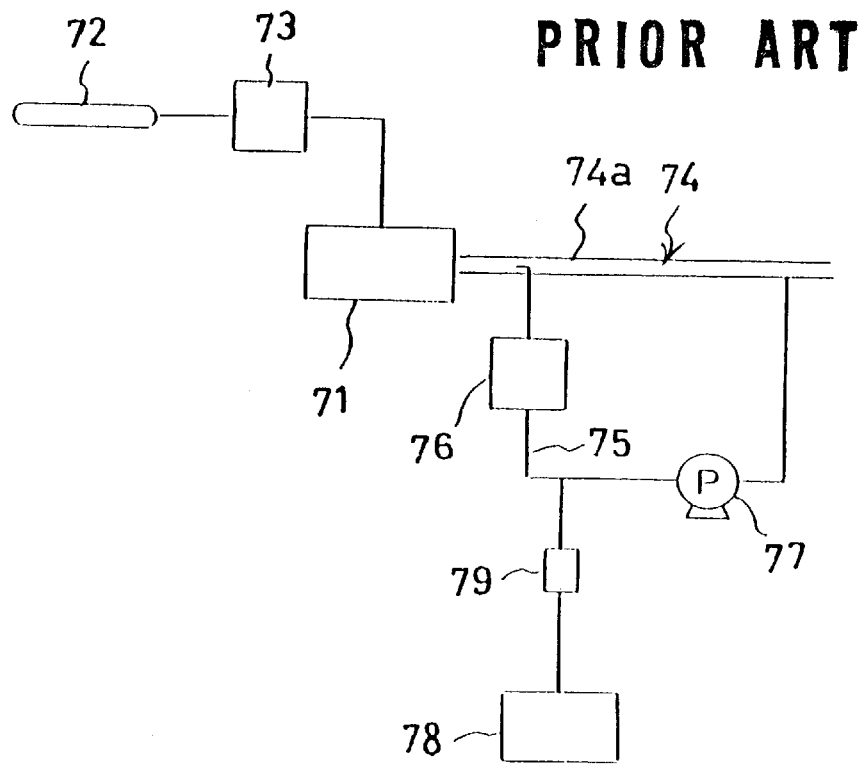
FIG. 22 is a schematic view of the conventional apparatus.

FIG. 21 shows one example of changes of the output signal with respect to time in a $CO_2$ meter (which may be any one of the gas analyzers shown with reference character 11 in FIG. 1) when 1,930 ppm of helium gas (span gas, span gas ① used in the sixth embodiment) with 14.6% $CO_2$ mixed with $N_2$ used as a bas is used for the span gas, and when 1,920 ppm of helium gas (span gas, span gas ② used in conventional technology) with $N_2$ used as a base is used for the span gas. The upper column shows the output of the $CO_2$ meter, and the lower column the output of the trace gas analyzer 13.

Suppose that the concentration of helium gas per unit strength in span gas ① and span gas ② is $C_1$, $C_2$, respectively. When calibrated with the span gas ① with no $CO_2$ mixed, the span gas ② is strength×$C_1$=1,880 ppm. When calibrated with the span gas ① with $CO_2$ mixed, the span gas ① is strength×$C_2$=1,970 ppm. That is, when calibrated with the span gas with no $CO_2$ mixed, there is a problem in that the reading of helium gas in the exhaust gas becomes higher than the actual value, and the reading of the exhaust gas flow rate becomes lower. Alternatively, there is a problem in that the reading of helium gas in the exhaust gas becomes lower than the actual value, and the reading of the exhaust gas flow rate becomes higher. In the sixth embodiment described above, since about 15% of $CO_2$ is mixed to the span gas used hitherto, the above-mentioned problems are not caused.

When the zero-point calibration is carried out, it is not always necessary to add $CO_2$ for the zero gas Z and pure $N_2$ may be designed to be used.

As described above, in the sensitivity calibration method of the trace gas flow meter according to the sixth embodiment of the invention, as the gas containing $CO_2$ in the concentration similar to that of $CO_2$ contained in the exhaust gas is used for the zero gas Z and as the span gas SP used for calibration gas, respectively, the change in the sensitivity can be suppressed to be as low as possible. In particular, in the preceding process of the trace gas analyzer 13 to which the calibration gas is supplied, because the capillary 14 which is used is the same as that used when the sample gas S is introduced to the trace gas analyzer 13 is used, the gas flow rate at the time of calibration can be set to the level same as the gas flow rate at the time of measurement. A highly accurate calibration can thus be carried out.

In the embodiment described above, helium gas as trace gas is designed to mix with the exhaust gas flowing the exhaust passage 3 downstream of the engine 2. However, it may be configured as in the case of the seventh embodiment of the invention described as below. In the seventh embodiment, the trace gas supply passage 4 is connected to the engine 2 as shown with the virtual line 4' in FIG. 19.

The sixth and seventh embodiments of the invention shall not be limited to the above-mentioned configurations, but, for example, when the calibration is carried out, the trace gas analyzer 13 is separated from the passage 51, and the downstream side of the calibration gas supply passage 53 may be connected to the other end side of the capillary 14.

For the trace gas, any inert gas other than helium gas may be used. For the trace gas analyzer 13, various mass spectrometers, such as a quadruple mass spectrometer, may be used in addition to Sectorfield mass spectrometer. In addition, this invention can be applied not only to automobile engines but may also be used to calibrate the sensitivity of a trace gas flow meter designed to measure the flow rate of the exhaust gas of the internal combustion engines such as motors and boilers.

In the exhaust gas flow rate measuring equipment of the internal combustion engines according to the first and second embodiment of the invention, since the tube with a suitable inside diameter is used for a member to connect the gas sampling passage to the trace gas analyzer, the dead volume at the connections can be reduced as much as possible, and the delay in response caused by the dead volume can be reduced. Consequently, time lag with other gas analyzers connected to the gas sampling passage can be eliminated, and the highly accurate exhaust gas analysis can be carried out.

In the exhaust gas flow rate measuring equipment of the internal combustion engines according to the third and the fourth embodiments of the invention, since the gas sampling passage is connected to the trace gas analyzer via a porous thin film which is essentially only penetratabile by helium gas as trace gas, a problem in that the sensitivity varies in accordance with the gas component ratio in the exhaust gas can be solved.

In the exhaust gas flow rate measuring equipment of the internal combustion engines according to the fifth embodiment, as a tube whose cross-sectional profile is polygon is located in the exhaust pipe through which exhaust gas flows and as holes equipped in this tube are designed to spout the trace gas into the exhaust gas, a preferable turbulence is generated downstream of the point for introducing the trace gas into the exhaust pipe, and the exhaust gas and trace gas are surely and thoroughly mixed. Consequently, the exhaust gas flow rate can be measured with high accuracy.

In addition, in the sensitivity calibration method of the trace gas flow meter according to the sixth and the seventh embodiments of the invention, since calibration is carried out taking into account a large quantity of $CO_2$ with respect to $N_2$ in the exhaust gas, changes in the sensitivity can be suppressed and the desired calibration can be surely carried out.

The eighth embodiments of the invention shall not be limited to the above-mentioned embodiments. Assume the concentration of gas component A is 1/10 and at the same time water vapor exists for 1/10. Obviously the mass of the gas A is 1/10 assuming the density of gas A is 1 and the volume is also 1. The typical gas analyzer extract water vapor in order to avoid sensitivity interference from the water and then the concentration of gas A becomes 1/9. The trace gas method invented here can sample the dehumidified gas and the trace gas is also condensed as described in for the gas A. As a result, the technique can measure a flow rate that excludes partial flow of water and obtain a flow rate of 9/10. Obviously the product of the dehumidified concentration 1/9, and the dehumidified flow rate 9/10 gives the same amount of mass as calculated for pre-humidified sample.

What is claimed is:

1. Exhaust gas flow rate measuring apparatus for internal combustion engines, comprising:
    a gas analyzer;
    a gas sampling passage for supplying a sample gas to the gas analyzer;
    an exhaust passage linked to the internal combustion engine for receiving an exhaust gas and connected to the gas sampling passage at a connection point;
    a trace gas introduction tube connected to the exhaust passage at an introduction point for introducing a trace gas at an introduction rate;
    a hollow pole connected to the trace gas introduction tube and installed in the exhaust passage, the pole for receiving the trace gas including a hole for spouting the trace gas into the exhaust gas, the pole having a cross-sectional profile of a polygon in order to create a large turbulence;
    a trace gas analyzer located within the gas sampling passage for measuring a concentration of the trace gas; and
    a capillary for connecting the trace gas analyzer to the gas sampling passage, the capillary having an inner diameter;
    the concentration of the trace gas being measured by the trace gas analyzer when the trace gas is introduced upstream of the connection point of the gas sampling passage and the exhaust passage; and
    a flow rate of the exhaust gas of the internal combustion engine being measured based on the concentration of the trace gas and a rate at which the trace gas is introduced.

2. Exhaust gas flow rate measuring apparatus for internal combustion engines, comprising:
    a gas analyzer;
    an exhaust passage linked to the internal combustion engine;
    a trace gas introduction tube connected to the exhaust passage at an introduction point for introducing a trace gas at a introducing rate;
    a hollow pole connected to the trace gas introduction tube and installed in the exhaust passage, the pole for receiving the trace gas and including a hole for spouting the trace gas into the exhaust gas, the pole having a cross-sectional profile of polygon in order to create a large turbulence;
    a gas sampling passage connected to the exhaust passage for supplying a sample gas to the gas analyzer;
    a trace gas analyzer located within the gas sampling passage for measuring a concentration of the trace gas; and
    a capillary connecting the trace gas analyzer to the gas sampling passage, the capillary having an inner diameter;
    the concentration of trace gas being measured with the trace gas analyzer when the trace gas is introduced at an introduction rate upstream of the internal combustion engine; and
    a flow rate of the exhaust gas of the internal combustion engine being measured based on the concentration of the trace gas and the introduction rate of the trace gas.

3. Exhaust gas flow rate measuring apparatus for internal combustion engines, comprising:
    a gas analyzer;
    a gas sampling passage for supplying a sample gas to the gas analyzer;
    an exhaust passage linked to the internal combustion engine and connected to the gas sampling passage at a connection point;
    a trace gas analyzer located in the gas sampling passage for measuring a concentration of a trace gas, the trace gas including helium; and
    a porous thin film connected between the gas sampling passage and the trace gas analyzer, the film being configured to allow penetration by helium only;
    the concentration of the trace gas being measured by the trace gas analyzer when the trace gas is introduced at an introduction rate upstream of the connection point of the gas sampling passage and the exhaust passage; and
    a flow rate of the exhaust gas of the internal combustion engine being measured based on the concentration of the trace gas and the introduction rate of the trace gas.

4. The exhaust gas flow rate measuring apparatus according to claim 3 wherein the porous thin film comprises polytetrafluoroethylene.

5. Exhaust gas flow rate measuring apparatus for internal combustion engines, comprising:
    a gas analyzer;
    a gas sampling passage for supplying a sample gas to the gas analyzer;
    an exhaust passage linked to the internal combustion engine and connected to the gas sampling passage;
    a trace gas analyzer located in the gas sampling passage for measuring a concentration of a trace gas, the trace gas including helium; and
    a porous thin film connected between the gas sampling passage and the trace gas analyzer for allowing penetration only by helium;
    the concentration of the trace gas being measured by the trace gas analyzer when the trace gas is introduced at an introduction rate upstream of the internal combustion engine; and
    a flow rate of the exhaust gas of the internal combustion engine being measured based on the concentration of the trace gas and the introduction rate of the trace gas.

6. The exhaust gas flow rate measuring apparatus according to claim 5 wherein the porous thin film comprises polytetrafluoroethylene.

7. Exhaust gas flow rate measuring apparatus for internal combustion engines, comprising:
    an exhaust pipe linked to an internal combustion engine for receiving exhaust gas;

a trace gas introduction tube connected to the exhaust pipe at an introduction point for introducing a trace gas at an introduction rate;

a hollow pole connected to the trace gas introduction tube and installed in the exhaust pipe, the pole for receiving the trace gas and including a hole for spouting the trace gas into the exhaust gas, the pole having a cross-sectional profile of a polygon in order to create a large turbulence; and a trace gas analyzer associated with the exhaust pipe for measuring a concentration of the trace gas downstream from the introduction point and for measuring a flow rate of the exhaust gas based on the trace gas introduction rate and the concentration of the trace gas.

8. The exhaust gas flow rate measuring apparatus according to claim 7 wherein ends of the pole are separated from an inner wall of the exhaust pipe.

9. The exhaust gas flow rate measuring apparatus according to claim 7 wherein the cross-sectional profile of the pole in a flow direction of the exhaust gas is asymmetrical.

10. The exhaust gas flow rate measuring apparatus according to claim 7 wherein the cross-sectional profile of the pole is triangular.

11. The exhaust gas flow rate measuring apparatus according to claim 7 wherein the cross-sectional profile of the pole is a quadrangle.

12. The exhaust gas flow rate measuring apparatus according to claim 7 wherein the cross-sectional profile of the pole is a hexagon.

* * * * *